United States Patent
Hopkins

(10) Patent No.: US 9,646,270 B2
(45) Date of Patent: May 9, 2017

(54) SYSTEMS AND METHODS FOR IDENTIFYING, CATEGORIZING, AGGREGATING, AND VISUALIZING MULTI-DIMENSIONAL DATA IN AN INTERACTIVE ENVIRONMENT

(71) Applicant: Nancy J. Hopkins, Dallas, TX (US)

(72) Inventor: Nancy J. Hopkins, Dallas, TX (US)

( * ) Notice: Subject to any disclaimer, the term of this patent is extended or adjusted under 35 U.S.C. 154(b) by 239 days.

(21) Appl. No.: 14/315,496

(22) Filed: Jun. 26, 2014

(65) Prior Publication Data
US 2015/0006515 A1    Jan. 1, 2015

Related U.S. Application Data

(60) Provisional application No. 61/839,621, filed on Jun. 26, 2013.

(51) Int. Cl.
  G06F 17/30      (2006.01)
  G06Q 10/06     (2012.01)
(52) U.S. Cl.
  CPC ................. G06Q 10/063 (2013.01)
(58) Field of Classification Search
  CPC ....................................................... G06F 17/30
  See application file for complete search history.

(56) References Cited

U.S. PATENT DOCUMENTS

| | | | |
|---|---|---|---|
| 8,694,441 B1 * | 4/2014 | Rothschild ....... | G06Q 10/06398 705/2 |
| 8,838,585 B2 * | 9/2014 | Leslie ............... | G06F 17/30572 705/321 |
| 2004/0128322 A1 * | 7/2004 | Nagy ..................... | G06Q 10/10 707/999.104 |
| 2006/0229902 A1 * | 10/2006 | McGovern ............. | G06Q 10/06 705/321 |
| 2012/0131487 A1 * | 5/2012 | Leonard ................ | G06F 17/211 715/771 |
| 2014/0214945 A1 * | 7/2014 | Zhang ................... | H04L 67/306 709/204 |

* cited by examiner

*Primary Examiner* — Khanh Pham
(74) *Attorney, Agent, or Firm* — James H. Ortega; Carstens & Cahoon, LLP

(57) ABSTRACT

The disclosed principles provide on-demand systems and related methods for identifying, categorizing, calculating, formatting, aggregating, linking, and visualizing multi-dimensional data in an interactive simulation environment. Simulation results are customized for each end-user based on selection criteria provided by the end-user via interactive network-based dashboards. The disclosed principles may be deployed either as an on-demand or SaaS deployment, public or private, or on the user's own servers. Business data for any number of businesses, executives, employees and individuals may be provided by any data source including customers/subscribers. The disclosed system/service does not rely on data provided from end-users, such as personal contact databases, electronic rolodexes, career job sites, or business or social media networking websites. Instead, the disclosed principles provide an aggregation of data in any of a number of categories to end users for their use in identifying relationships between, for example, employers, customers, competitors, prospects, partners, vendors, business consultants, investors, mergers, executives, employees, clients, and individuals.

34 Claims, 29 Drawing Sheets

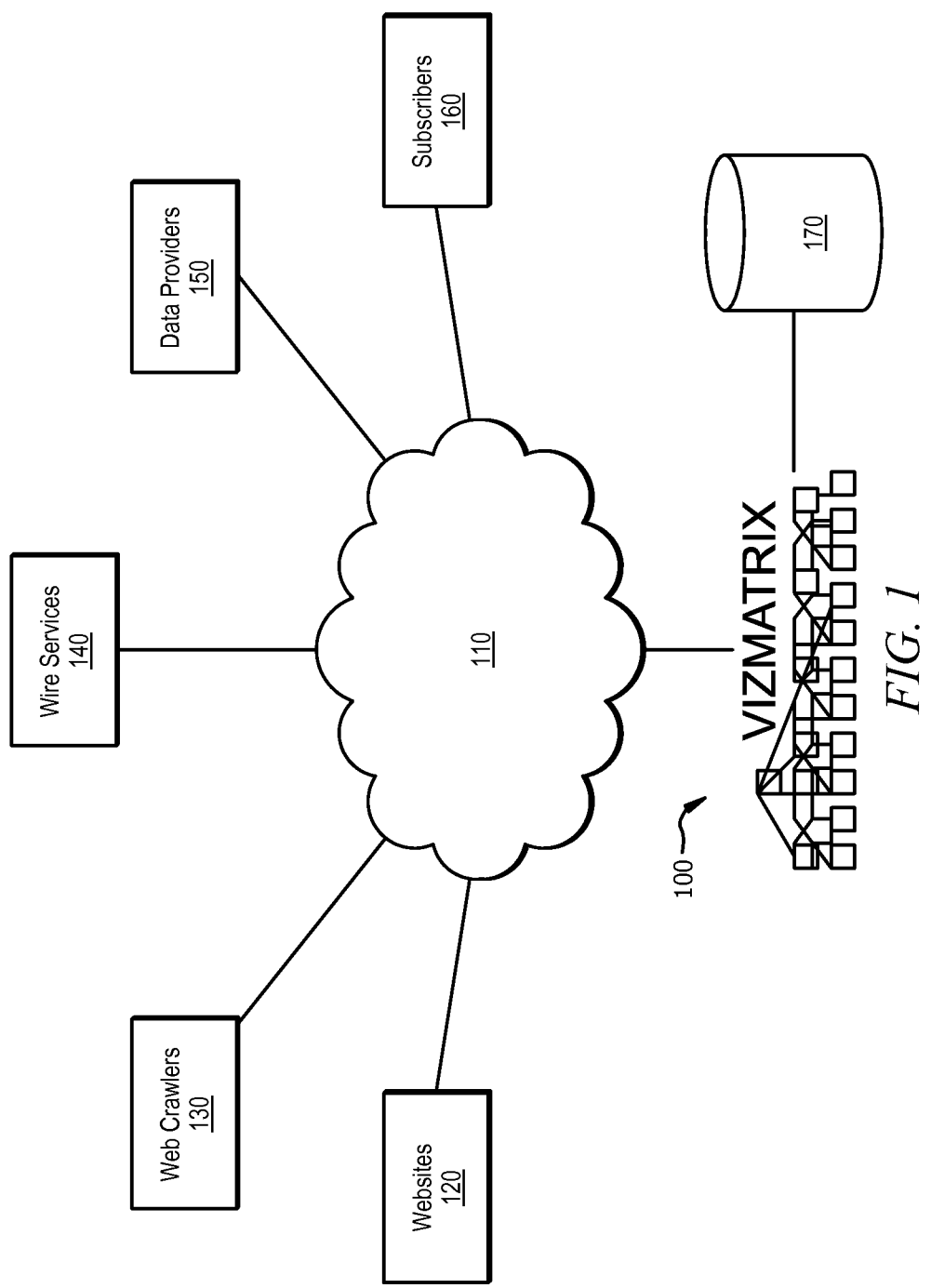

200

Business Plans
Investment Plans
Strategic Plans
Sales Plans
Account Plans
Marketing Plans
Opportunity Analysis
Partner Plans
Channel Mgmt Plans
Customer Plans
Competitor Intelligence
Customer Intelligence
Development Plans
Fundraising Plans
Product Plans
Merger & Acquisition Plans
HR Plans
Political Campaign Plans
Recruiting Plans
Resource Allocation Plans
Sports Events Plans
Succession Plans
Supply Chain Plans
Training Plans
Vendor Mgmt Plans
VIP Events Plans

*FIG. 2*

SYSTEMS AND METHODS FOR IDENTIFYING, CATEGORIZING, AGGREGATING, AND VISUALIZING MULTI-DIMENSIONAL DATA IN AN INTERACTIVE ENVIRONMENT

PRIORITY CLAIM

The present disclosure is a non-provisional conversion of, and thus claims priority to, U.S. Provisional Patent Application No. 61/839,621, filed Jun. 26, 2013, the entirety of which is incorporated herein by reference for all purposes.

TECHNICAL FIELD

The present disclosure relates generally to exploiting relationships and connections among individual and business resources, and more specifically to on-demand systems and methods for identifying, calculating, formatting, extracting, aggregating, linking, and visualizing multi-dimensional data in a relational database(s) in an interactive simulation environment for presentation to end-users for use in leveraging information in the simulation environment to discover beneficial opportunities, strategies, plans and insight.

BACKGROUND

Enterprise business transformation and strategic alignment dependent on internal cross-functional teams, including Six Sigma teams, without competitive benchmarking data often do not think outside the box. Postponing business transformation and strategic alignment of business practices, applications, and systems until a company has missed or lost lucrative opportunities is often a huge eye-opener when the company is experiencing negative revenue growth, profitability, customer satisfaction, and loss of market share. Corporate divisions, groups, and teams across the company are often found working in separate vertical silos. This is a major inhibitor to not only teaming and cross-selling inside the company, but also is a major inhibitor to growing revenue and providing superior customers with superior customer service.

A proliferation of systems, applications, and employees typically available for performing similar data input tasks may include executive information systems, business intelligence systems, competitive intelligence systems, strategic planning systems, sales force automation (SFA) systems, lead and referral systems, marketing systems, CRM systems, intellectual capital systems, knowledge management systems and human resources systems. However, operating with such redundant business practices, applications and systems can be very costly and not responsive to employee, customer or revenue growth objectives. It is even more costly (and ultimately redundant) when multiple divisions and thousands of employees in a variety of business functions across a global corporation are purchasing the same external market data from the same vendors.

Enormous number of paper chases and fire drills take place to respond to management requests. The proliferation of business plans, strategies, as well as sales, marketing, and human resource plans that are manually input into separate systems and delivered in manual and electronic delivery manners utilizing a variety of applications, such as email, dashboards, spreadsheets, presentations and databases, leads to a loss of business and employee productivity and high costs. Information in these systems is only as good as the information put into them, and is often unreliable and seen as a mandatory reporting activity. Information in these systems is input, extracted, and viewed one record at a time, one business and one individual at a time. Prospect lists, strategies and business plans are often entered in various formats as "attachments" and become archived historical information of no use to the people who entered the information in the systems or the management team. Independent systems and applications residing in multiple business units and geographies, and high turnover of employees, are not conducive to providing the corporation with efficient corporate reporting or a "corporate memory." Training costs associated with training current employees and new hires how to access and manually input data in these systems are astronomical.

Additionally, there is typically no way to determine how many divisions and employees are communicating with the same target company that one division may view as a prospect, another division as a current customer, another division as a competitor, another division as a partner, another division as a vendor, and corporate headquarters as a business consultant. In such situations, senior management often must be engaged to resolve internal conflicts between one or more divisions. In large corporations, hundreds of products are being developed simultaneously across the company in different divisions. Often these product development groups learn by word of mouth that they are developing similar products. Some product development divisions may in fact be competing with other divisions to get their product to market first. While competing internally for market share, they are often blind-sided by external competitors beating them to market with a similar or superior product. Without gathering critical customer-related "wants and needs" information from customers and prospects, or benchmarking pricing to insure it is not overly or under priced, product development groups may find their products are "dead on arrival." Once again, the company may experience a huge loss in time, money and productivity.

Management looks at mergers and acquisitions as a means to grow revenue and become more competitive in the marketplace. Companies often acquire companies that are competitors with similar products and services. How and when to merge newly acquired companies, such as software companies with an existing software division that has been competing with the acquired company for many years, is not an easy task. Duplication of headcount, skills and product development is costly while undergoing this process. Human resources employees often find themselves engaged in a costly human resources system integration project to integrate employee records instead of merging employees into a single division. Instead of reducing operating costs, human resources costs rise.

Although management demands revenue growth from its sales organizations, this business area experiences the highest turnover rate of sales reps and sales managers. New sales reps and managers are given one or more prospect, customer, territory, or mailing list to work with, along with instructions to "go sell something." Although prior reps and managers may have left some prospect and customer information in a sales force automation system, it is often old information and not useful. In some cases, prior reps and managers take the prospect and customer information with them when they leave the company. Business and personal relationships are held close to the vest, not openly shared or discussed. Newly hired sales reps and sales managers may find prospect and customer information was deleted from the system. This unfortunately means many sales reps and managers have no relationships with the prospects they are assigned. In essence, they are "cold calling" without knowledge of key influencers, buyers and decision-makers, and thus these sales reps and account managers are just shooting in the dark.

Developing proposals and responding to Requests for Proposal (RFPs) without having any relationships with the prospect or customer is often a futile and costly task. Purchasing agents may have distributed the RFP as a means to benchmark multiple suppliers' proposed solutions as a roadmap to develop the solution internally, or use RFPs as a wedge to drive down each suppliers' proposed costs. An external management consultant may have worked with the client to shape the proposal towards the management consultant's solutions, resulting in sales reps from its competition having little to no probability of gaining business with this prospect. Sales reps and account managers face another obstacle when they rely on a single-point-of-contact at prospect and customer sites to refer them into other areas of the account. Growing the account horizontally is a long slow process, particularly if the customer single-point-of-contact is a manager or purchasing agent and the decision-maker, buyer or influencer is held at arms' length. Account managers often learn too late that competitors have better relationships with the account manager's account than the account manager. Without knowledge that relationships and shared datasets exist between the account manager's employers, customers, competitors, prospects, partners, vendors, business consultants, executives, employees and individuals, it's only a matter of time the account will be lost to a competitor with better and more fully developed connections.

Human resources (HR) managers and executive recruiters face further system and application obstacles. Employee resumes and biographies gained by one division are often not shared with another. Instead, resumes are placed in an archive database. HR managers and executive recruiters seeking executives, employees and/or skills are limited to searching one or more systems one record at a time, or are limited to extracting a list of records in the system and must review each record one at a time. Succession planning may be based on internal personal and business relationships instead of selecting employees based on experience and required skill sets. If employees, resumes, or skill sets are needed to fill roles in a newly formed business unit, human resources often looks outside the company for skills that it may have internally in many divisions across the corporation, but has no current way to know people and skills are already available internally. Moreover, locating resumes and skills of current employees is often a futile task. Job seekers face similar "single record" access and viewing obstacles with job search websites and corporate websites.

SUMMARY

This Summary is provided to introduce a selection of concepts in a simplified form that are further described below in the Detailed Description. This Summary is not intended to identify all key features or essential features of any claimed subject matter derived from the present disclosure, nor is it intended to limit the scope of any claimed subject matter derived from the present disclosure.

For solving the above-discussed deficiencies, the disclosed principles provide an on-demand system and method for identifying, calculating, formatting, extracting, aggregating, linking and visualizing multi-dimensional data in a relational database(s) in an interactive simulation environment for presentation to end-users. The disclosed principles automatically provide varying levels of insight for each end-user. Simulation results are customized for each end-user based on selection criteria provided by the end-user. More specifically, the disclosed principles include storing model and model variable data within a relational database system, receiving a request from a user interfacing with the system via an interface, extracting search criteria and presentation preferences from the request, formulating and executing one or more queries on the database(s) to retrieve the matching data, formatting the data in accordance with the request and in accordance with system standards, and returning the aggregated data to the requesting user in the form of simulated opportunities, strategies, plans and insight on interactive dashboards that visually display multi-dimensional shared datasets between businesses and individuals. Known and unknown shared datasets between one or more businesses and/or individuals, such as employers, customers, competitors, prospects, partners, vendors, business consultants, investors, mergers, executives, employees, and individuals, are identified by various attributes in a multi-dimensional relational database and automatically displayed visually in an aggregated manner to each end-user on-demand in the form of simulated opportunities, strategies, plans and insight on interactive dashboards using an established framework of the disclosed principles.

In one aspect, computer implemented systems for identifying and visualizing matching results for presentation to end-users are disclosed herein. In one embodiment, such a system provides for retrieving application metadata and presenting a multi-dimensional visual representation of a plurality of metadata objects. Such a system may comprise a data storage for storing empirical information in profiles corresponding to entities, where the empirical information comprises attributes of said entities gathered from a plurality of data sources external to said system. Such an exemplary system may also include a user interface configured to receive a query from a user of the system, where the query comprises a plurality of empirical search criteria seeking one or more of said entities having attributes matching said empirical search criteria. A system may also include a data aggregator, which may be configured to retrieve profiles from the data storage having one or more attributes matching at least one of the empirical search criteria, as well as identify matching attributes common to one or more groups of a plurality of entities corresponding to the retrieved profiles. An exemplary system may also include a visualization component configured to gather the retrieved profiles and to provide a visual indicator corresponding to each of the identified matching attributes common among each plurality of entities. Furthermore, such a system in accordance with the disclosed principles may include a display generator configured to create one or more visible matrices for display to the user, each comprising a presentation of the retrieved profiles and the visual indicators illustrating the identified matching attributes common among each plurality of entities.

In another aspect, computer implemented methods for identifying and visualizing matching results for presentation to end-users are disclosed herein. In one embodiment, such a method provides for retrieving application metadata and presenting a multi-dimensional visual representation of a plurality of metadata objects. Such a method may comprise storing empirical information in profiles corresponding to entities, where the empirical information comprises attributes of said entities gathered from a plurality of data sources external to said system. Such an exemplary method may also comprise receiving a query from a user of the system via a user interface, where the query comprises a plurality of empirical search criteria seeking one or more of said entities having attributes matching said empirical search criteria. Such a method may further include aggregating data from the data storage based on the query to retrieve profiles from the data storage having one or more attributes matching at least one of the empirical search criteria, and to identify matching attributes common to one or more groups of a plurality of entities corresponding to the retrieved profiles. This exemplary method may also include gathering the retrieved profiles to provide a visualization of the aggregated data, including providing a visual indicator corresponding to each of the identified matching attributes common among each plurality of entities. Additionally, such exemplary methods may include generating a display comprising one or more visible matrices for display to the user, each comprising a presentation of the retrieved profiles and the visual indicators illustrating the identified matching attributes common among each plurality of entities.

BRIEF DESCRIPTION OF THE DRAWINGS

Embodiments of the disclosed principles are described herein with reference to accompanying drawings in which like numerals refer to like elements, and in which:

FIG. 1 illustrates a visual representation of a number of exemplary data sources and other resources that a system or method in accordance with the disclosed principles may interact with to obtain data for the disclosed system;

FIG. 2 provides a slide setting forth a number of exemplary uses of a system or service provided in accordance with the disclosed principles;

DETAILED DESCRIPTION

Figure 3:
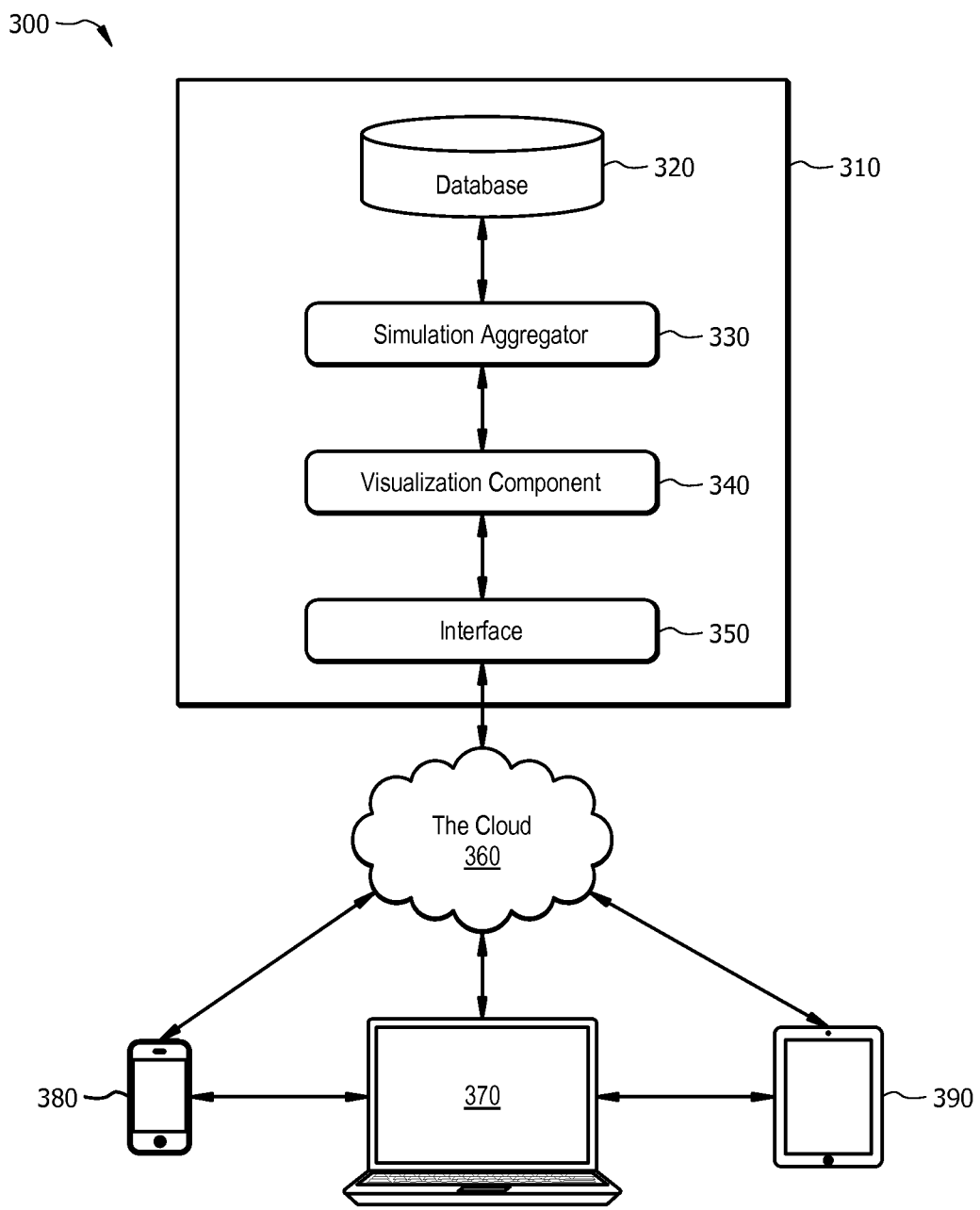
FIG. 3 illustrates one embodiment of a network architecture comprising an end user accessing a system in accordance with the disclosed principles.

The disclosed principles provide an on-demand system and method for identifying, calculating, formatting, extracting, aggregating, linking, and visualizing multi-dimensional data in an interactive simulation environment. The disclosed principles provide varying levels of insight for each end-user. Simulation results are customized for each end-user based on selection criteria provided by the end-user. The disclosed principles include storing model and model-variable data within a relational database system, receiving a request from a user interfacing with the system or service via an interface (e.g., a web-based interface), extracting search criteria and presentation preferences from the request, formulating and executing one or more queries on the database to retrieve the matching data, formatting the data in accordance with the request, and returning the aggregated data to the requesting user in the form of simulated opportunities, strategies, plans and insight on interactive dashboards. Known and unknown shared datasets of empirical information among entities, such as businesses, organizations, associations, agencies, and individuals, which may also be employers, customers, competitors, prospects, partners, vendors, consultants, investors, mergers, executives, employees, and independent individuals are identified by such various attributes or characteristics, and automatically displayed visually in an aggregated manner to each end-user on-demand in the form of simulated opportunities, strategies, plans and insight on interactive dashboards using the established framework.

Businesses, including but not limited to, private and public businesses, non-profits, universities, federal, state and local agencies, may be identified during use of the disclosed principles. Other examples include business areas, including but not limited to, management, corporate development, finance, mergers and acquisitions, billing, human resources, sales, marketing, product development, research and development, executive recruiters, and non-profit fundraisers can conduct numerous simulations by selecting one or more shared datasets pertaining to entities, including but not limited to, businesses, executives, employees and/or individuals. Individual attributes or characteristics including, but not limited to, board members', officers' and directors', executives', and employees' current and former employers, professions, professional experience, positions or titles, skills, level of education and educational institutions attended, degrees held or other level(s) of education, graduation dates, political affiliations, other affiliations (e.g., research council, president's council) and various hobbies/ personal interests are also utilized. In an advantageous embodiment, attributes of entities identified by a system or method according to the disclosed principles may also include the attribute of the professional relationship one entity within the database has with respect to another entity. For example, such a professional relationship may include that the first entity is an employer, employee, owner, executive, partner, investor, consultant, customer, client, competitor, or vendor of another entity. Such this attribute, an end user can not only identify entities of interest and the attributes or characteristics they have in common with other entities, but may further see if such attribute demonstrates a pre-existing relationship between the entities. In the database(s), all businesses and individuals may also have corporate headquarters addresses and corporate main telephone numbers. Individuals' home office addresses, email addresses, and telephone numbers may be provided by external data services to populate the database(s). The disclosed principles may be configured to detect those entries that do not have an email address and may be further configured to populate the email address field with similar email addresses as other individuals employed in the same company.

FIG. 1 illustrates a visual representation of a number of exemplary data sources and other resources that a system or method 100 in accordance with the disclosed principles may interact with to obtain data, e.g., empirical information regarding attributes or characteristics belonging to entities and stored in profiles, for the disclosed system or method. As illustrated, such interaction would typically be across a network 110, such as the Internet. In some exemplary embodiments, the disclosed principles may extract and use data from websites 120, such as Salesforce.com®, LinkedIn.com®, or even search engines such as Google® and Yahoo®. In addition, the disclosed system or method may employ "web crawlers" 130 to seek out data, or employ wire services 140 or other types of data providers 150 for providing such data to the system. Still further, the disclosed principles may use data provided by its own customers or subscribers 160 to help populate the data storage or other type of database system 170 used by the disclosed system or method to store the obtained data. In other embodiments, the disclosed principles may provide services to these companies or sites, and in yet other embodiments the disclosed principles simply replace the need to use one or more of these company's data which gather important data for one or more of the uses described above.

FIG. 2 provides a slide 200 setting forth a number of exemplary uses of a system or service provided in accordance with the disclosed principles. The disclosed principles can provide each of these exemplary plans as a Strategy-as-a-Service, Strategic-Data-as-a-Service, Simulation-as-a-Service, and Visualization-as-a-Service product that revolutionizes the way businesses and people interact. The data employed by the disclosed principles is essentially unlimited, and uses can be employed to any or all of areas of financial services (e.g., Wall St.), executive recruiters, non-profit agencies, universities, political fundraising campaigns, federal, state and local intelligence systems, and large/medium/small businesses. The disclosed principles leverage company, executive, employee and people data across companies, people, geographies, industries, areas of expertise, political & university affiliations, and more in an innovative framework, methodology and automated solution to facilitate enterprise transformation and strategic alignment of systems and people across a company or other end users.

FIG. 3 illustrates is a simplified high-level block diagram of an exemplary network architecture 300 comprising a system 310 in accordance with the disclosed principles receiving a query from an end-user. The exemplary system 310 includes database 320, a simulation aggregator 330, a visualization component 340, and a user interface 350.

To implement the system 310, and end user can employ any device to access the system 310 via a communications network 360, such as the Internet. The end user may employ a computer terminal 370, a mobile telephone 380, or a mobile computing device 390 (e.g., a tablet computer) to connect to the communications network 360. Once the end user has accessed the system 310, the end user sends a query to the system 310. The system 310 receives the query via the interface 350 which passes the query into the system processor for processing. The processor causes relevant data to be retrieved from the database 320, which may be comprised of one or more data stores of which some, all or none are locally maintained. The retrieved relevant data is provided to the simulation aggregator 330, which aggregates the data into a useable simulation of the information. Such a simulation provides visual relationships among the retrieved data, and that simulation is employed by the visualization component 340 to build a visual matrix illustrating the query results to the end user. The visual matrix of relevant data is then provided for display to the end user via the interface 350. Examples of the visual matrix are discussed in detail below.

Figure 4:
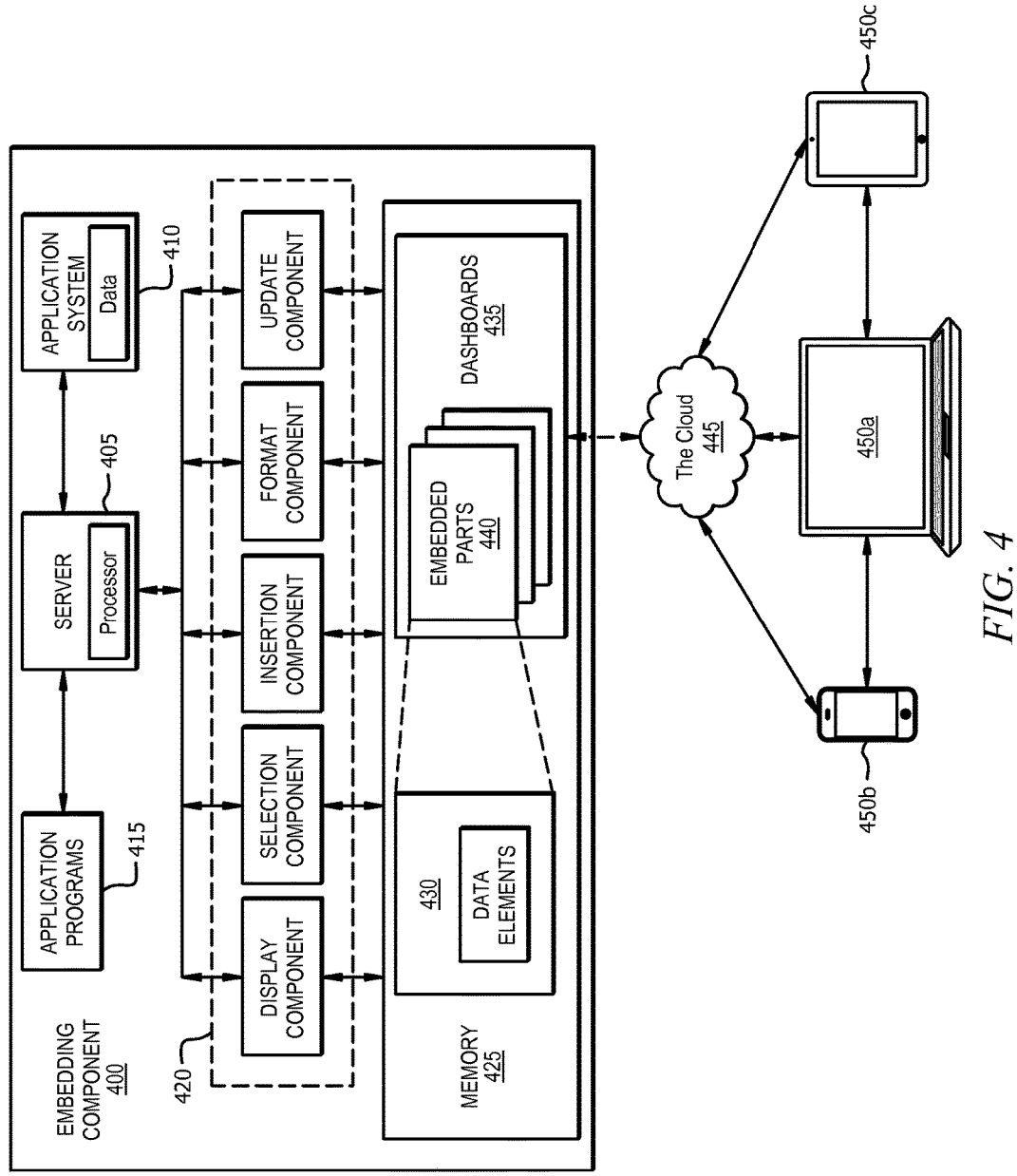
FIG. 4 illustrates an exemplary computer system architecture providing one embodiment of a system in accordance with the disclosed principles.

FIG. 4 illustrates an exemplary computer system architecture 400 providing one embodiment of the disclosed principles. As shown in FIG. 4, the computer system 400 includes, a server 405 and an application system 410, both interacting with application programs 411 to serve one or more clients 450a-c via a communication network 445. It may be appreciated that computer system 400 is a "push"

data model in this illustrated embodiment. Also, it may be appreciated that the computer 500 may comprise more or less elements as desired for a given implementation. It may also be appreciated that FIG. 4 also illustrates a subset of elements typically implemented for a computing device or system, and more detailed computing system architecture suitable for implementing the clients, the server, and/or the application system may be described with reference to FIG. 5 below. However, the disclosed principles are not limited to these embodiments.

Live data feeds from external data services and data in multiple formats are input, updated, and maintained in memory 425, which may comprise one or more data stores 430. The data or data elements are not required to be input by end-users. End-users may add additional businesses and individuals into the data store, but the system 400 will not allow users to add data regarding businesses and individuals into the system 400 if the data already exists in the data store. In some embodiments, end-users are not permitted to edit or delete data in the data store.

The system also includes an embedding component 420 for embedding specific data pertinent to results obtain from an end-user's query. Exemplary components of such an embedding component 420 include, but are not limited to, a display component, a selection component, an insertion component, a format component and an update component. Each such exemplary components are employable by the system 400 to facilitate compiling, displaying, and updating query results to a client in accordance with the disclosed principles. Specifically, the selection component may assist in selecting relevant query results from the data store(s), while the format component may be used to format the query results in an appropriate format for presentation to an end-user. The insertion component inserts the formatted selected data into a presentation components comprised as a "dashboard" 435 with which the end-user may interact with. The update component assists the end-user with updating his query results, as needed, but is also used in updating the data elements in the data store(s). The display component facilitates displaying the query results via a dashboard 435 to the end-user. Of course, additional or different components may be used with the system 400, as needed, and those skilled in the art will understand that an exemplary system according to the disclosed principles is not limited to having only certain components so long as it can provide aggregation and presentation of results as disclosed herein.

Within the dashboard 435 may be one or more embedded parts 440 for display and interaction with the end-user. The dashboard 435, which is described in further detail below, is used to both receive query requests and to provide query results to the end-user. Such receiving and providing of information may be across a communications network 445, such as the Internet. In other embodiments, the network 445 may be a private network to which only subscribing end-users have access. In either embodiment, end-users may access the system 400 using any type of terminal capable of interacting with the system 400, such as a computer terminal 450a, a mobile telephone 450b or similar device, or a tablet computer 450c or related device. Moreover, any type of data input, include voice modulation and touch-screen capability, may be used to interact with a dashboard of the disclosed system. Of course, the disclosed principles are not limited to any particular type of device for use in accessing an exemplary system 400.

Figure 5:
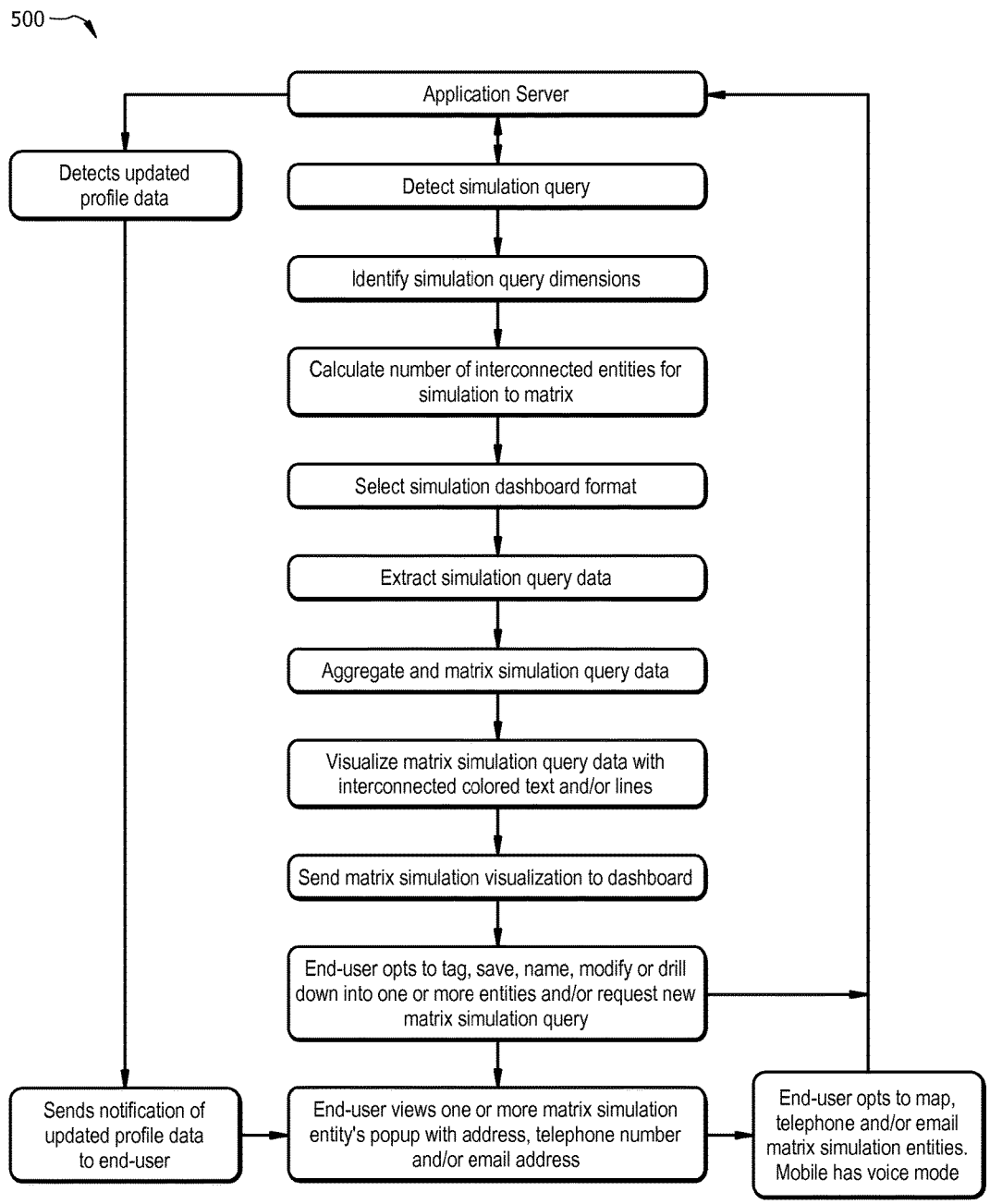
FIG. 5 illustrates a flow diagram of an exemplary process for aggregating and presenting query results to an end-user in accordance with the disclosed principles.

FIG. 5 illustrates a flow diagram 500 of an exemplary process for aggregating and presenting query results to an end-user in accordance with the disclosed principles. The process in the exemplary flowchart 500 may be representative of the operations executed by one or more embodiments described herein. As shown in FIG. 5, the logic flow may be implemented using the application server discussed above; however, other similarly operable component(s) may also be employed in accordance with the disclosed principles.

The illustrated exemplary process begins with the detection of the simulation query submitted, for example, by a client device. The simulation query dimensions are then identified. The system or process in accordance with the disclosed principles then calculates the number of interconnected entities (e.g., persons or businesses) retrieved by the query dimensions, and which will be simulated in the visible matrix created by the disclosed principles. The dashboard simulation format for presentation to the end-user may then be selected, and the query data retrieved by the system or process is extract for presentation. The simulation query data is then aggregated for creation of the visual matrix. The system or process then determines the visualized interconnections of the simulation's retrieved query data. For example, the interconnections may be illustrated to the end-user using colored text and/or lines illustrating related persons, characteristics, companies, or other information relating the query results. Once the visualization of the interconnections have been determined, the matrix simulation may then be sent to the dashboard for access by the end-user. Matrix simulation results may advantageously be customized for each end-user. Interactive simulation dashboards can access the simulation application anytime, anywhere, and on any video display device.

Next in the illustrated exemplary process, the end-user may opt to tag, save, name, modify, or "drill down" further into the displayed results in order to find more information, which may then also be presented in a new matrix simulation to the end-user. Also, the end-user may work further with the provided matrix simulation, for example, to reach out and contact one or more entities on the matrix simulation. Matrix simulations may be created such that "pop-ups" occur for matrix results when viewed by an end-user on a client terminal or similar device. Such pop-ups may include contact information for query results, such as address, telephone number, email address and the like. To contact an entity in the matrix simulation, the end-user can simply click on contact information like email addresses and telephone numbers that are provided in the matrix simulation, or even a map of the location of an entity in the matrix. Moreover, in embodiments where the matrix is provided to a mobile device, such as when the disclosed system or process is provided to end-users via a mobile device application, a voice feature may be provided for end-users to call entities in the matrix.

In addition, the exemplary process may also include the detection of updated data in the profiles and other data blocks related to entity information accessible by a system or process in accordance with the disclosed principles. In such situations, the process can determine when an entity has updated profile information, whether actively provided by the entity or if a source the system employs has updated this information. If such updated information is detected and is related to a matrix simulation provided to an end-user, then the exemplary process may send a notification of the updated profile data to the end-user so that he may have the most up-to-date entity information.

Figure 6:
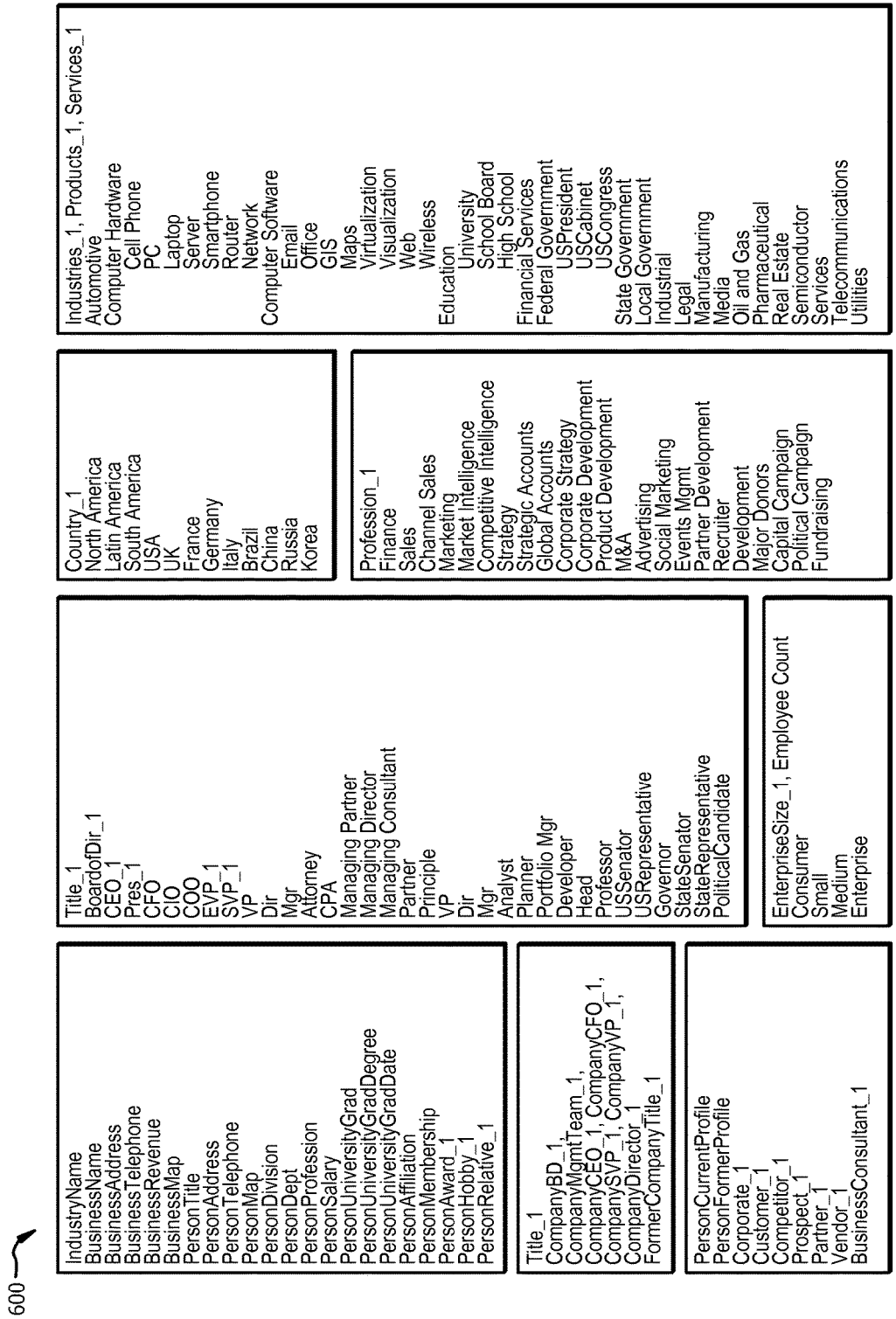
FIG. 6 illustrates exemplary field factors that may be interconnected and thereafter highlighted in a particular identifying manner to visually indicate interrelated data fields for a particular query.

FIG. 6 illustrates exemplary field factors 600 that may be interconnected and thereafter highlighted in a particular identifying manner, such as color coding, to visually indicate interrelated data fields for a particular query. Both the fields and the data elements are merely exemplary, and no limitation of the disclosed principles should be implied.

Figure 7:
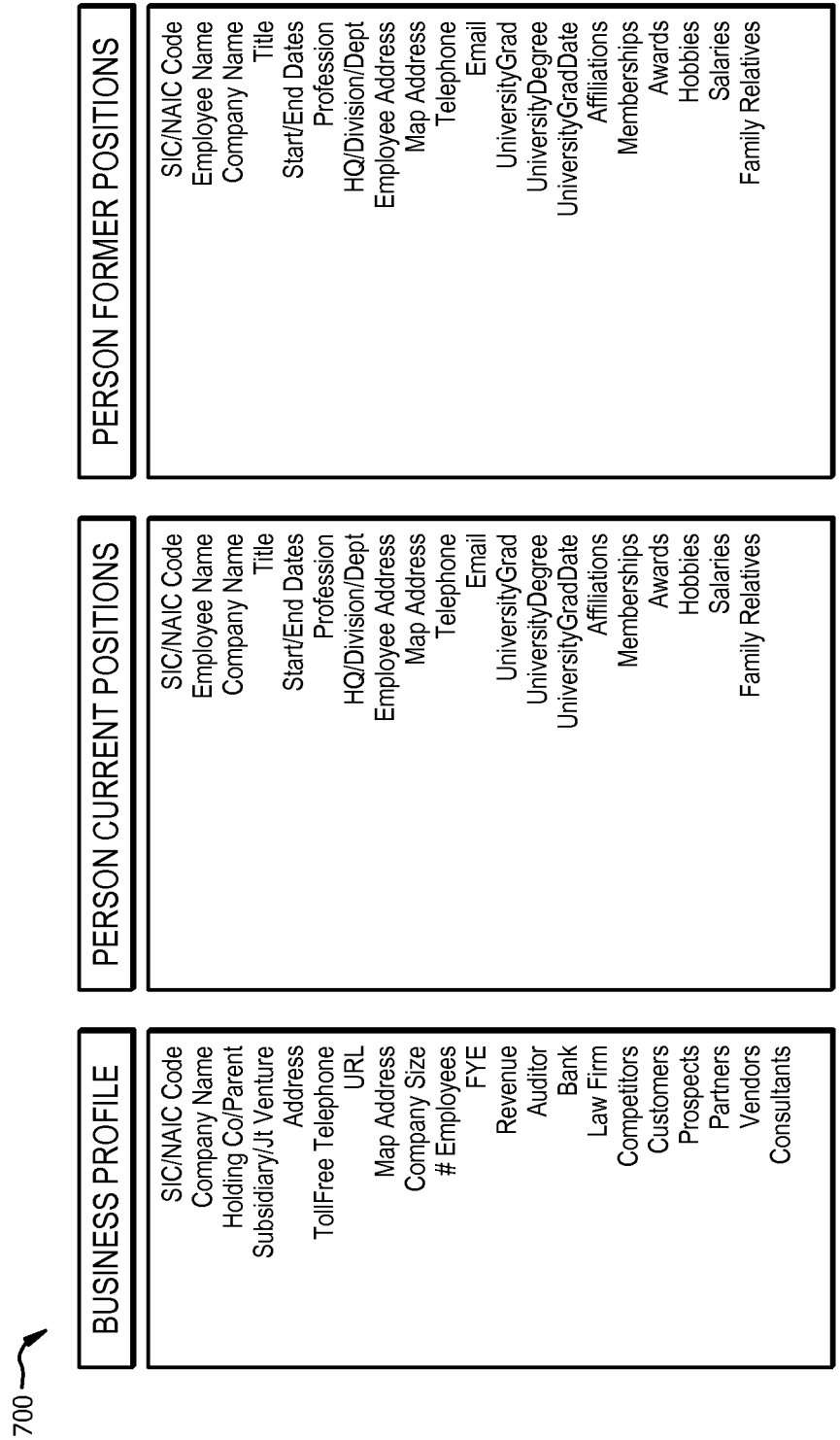
FIG. 7 illustrates exemplary databases that may be populated and employed by a system or process constructed or implemented in accordance with the disclosed principles.

FIG. 7 illustrates exemplary databases that may be populated and employed by a system or process constructed or implemented in accordance with the disclosed principles. The illustrated databases include the profile of a business that may come up in a query, the current positions of certain persons, as well as the former positions of persons that may come up in a query. Of course, other types of databases, or data element within such databases, may also be populated and employed by the disclosed principles.

Figure 8:
FIG. 8 illustrates one embodiment of a graphic user interface (GUI) that may be presented to an end user accessing a system of the disclosed principles via a web portal.

FIG. 8 illustrates one embodiment of a graphic user interface (GUI) 800 that may be presented to an end user accessing a system of the disclosed principles via a web portal. The GUI 800 is an exemplary embodiment of the Dashboard that may be presented to an end-user, and includes a wizard dialog for selecting source data elements. As shown in FIG. 8, the source data elements may include any number of defined formats, including a "Line Items as Table" an "All data as Text" format, an "All data as List" format, and an "All data (for ad hoc insertion)" format. Other defined formats may be utilized as well. Dashboard end-users may begin a new simulation or modify the current simulation by adding or deleting one or more query datasets of interest by selecting the "portal" button on the web-based dashboard.

Among some of the specific query fields and "pop-ups" for certain fields, as illustrated, are companies (e.g., past, present, or past and present), titles of persons, universities attended or degrees attained, and even personal hobbies of sought persons/entities. Of course, pop-ups may be provided for any of the fields so as to limit and end user to only certain terms for certain search fields, if desired. A date range for any or all of the provided fields may also be provided by an end-user. Even keyword searching is available with the disclosed principles. Of course, the disclosed principles are not limited to the specific query fields illustrated, and therefore additional or different fields may also be presented. Moreover, the offered fields may be dependent upon the type of entity sought, e.g., a person versus a company. Furthermore, there is no requirement that all fields must be employed for a query, although in some embodiments perhaps certain fields may be designated as required depending on the type of inquiry. For those end-users who are signed in, the query field information they enter may be saved for future use or simply for providing a record of the query.

Figure 9:
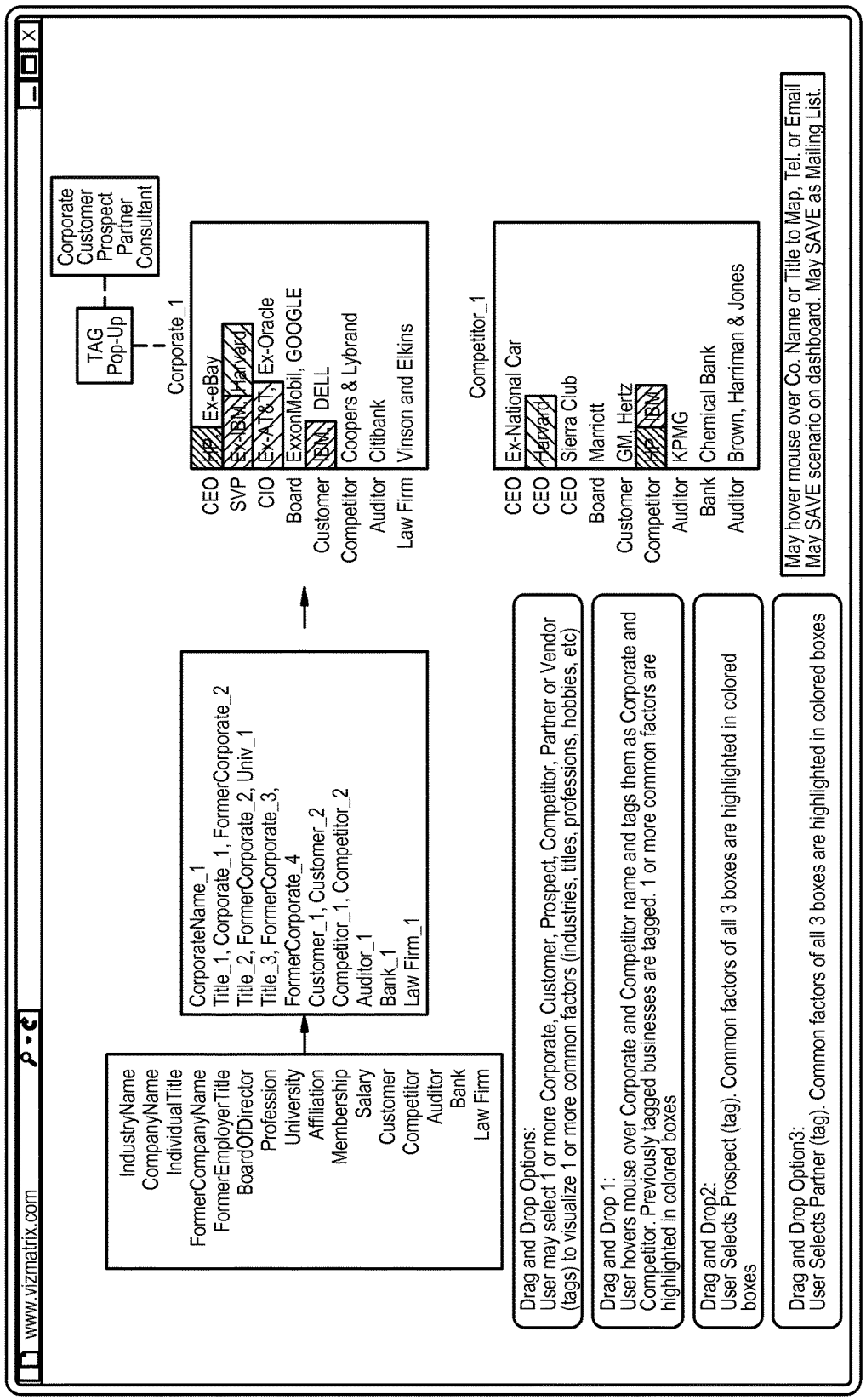
FIGS. 9-11 illustrate populated web-based dashboards with aggregated simulation outputs in a series of formats using an exemplary system in accordance with the disclosed principles.
Figure 10:
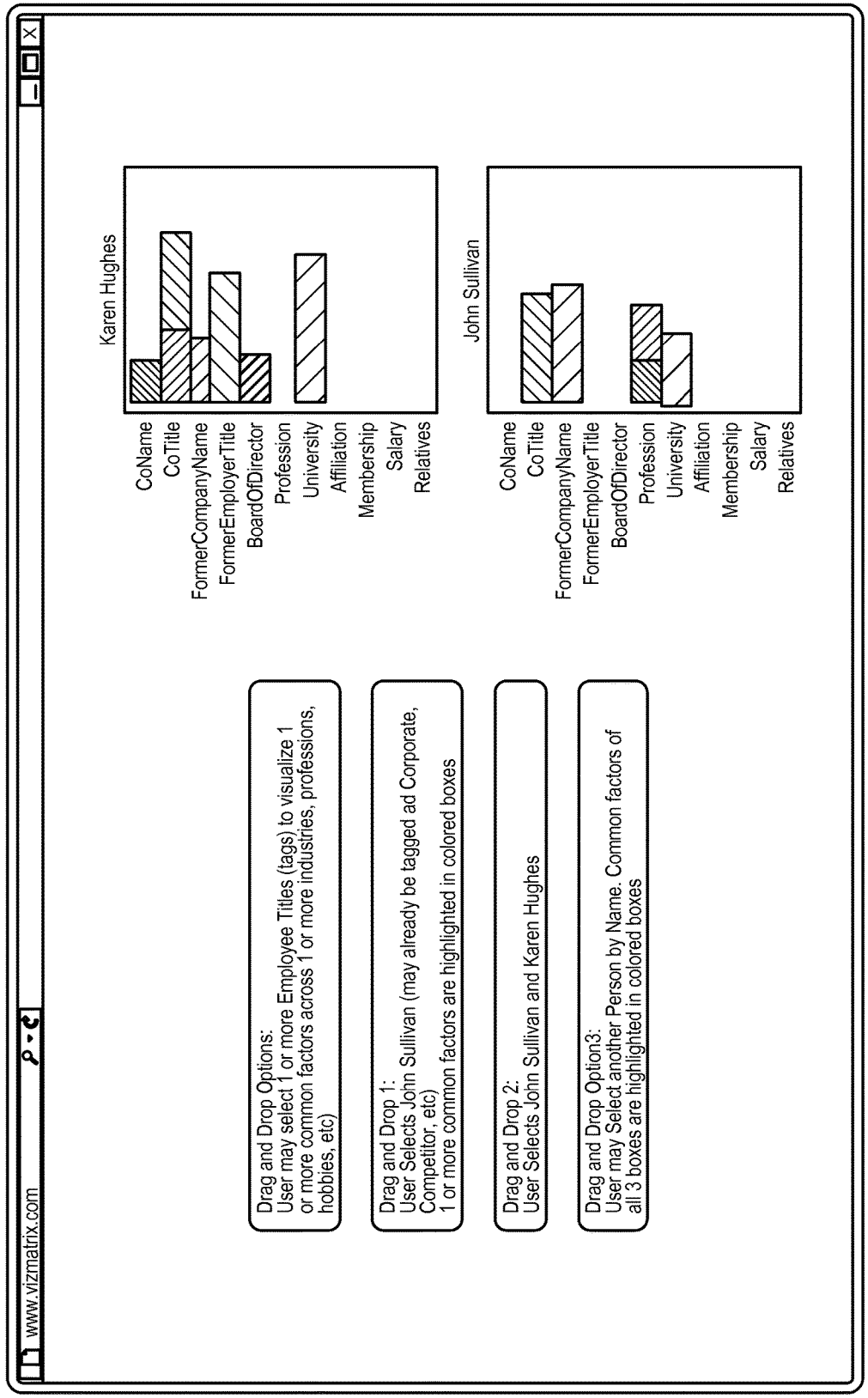
Figure 11:
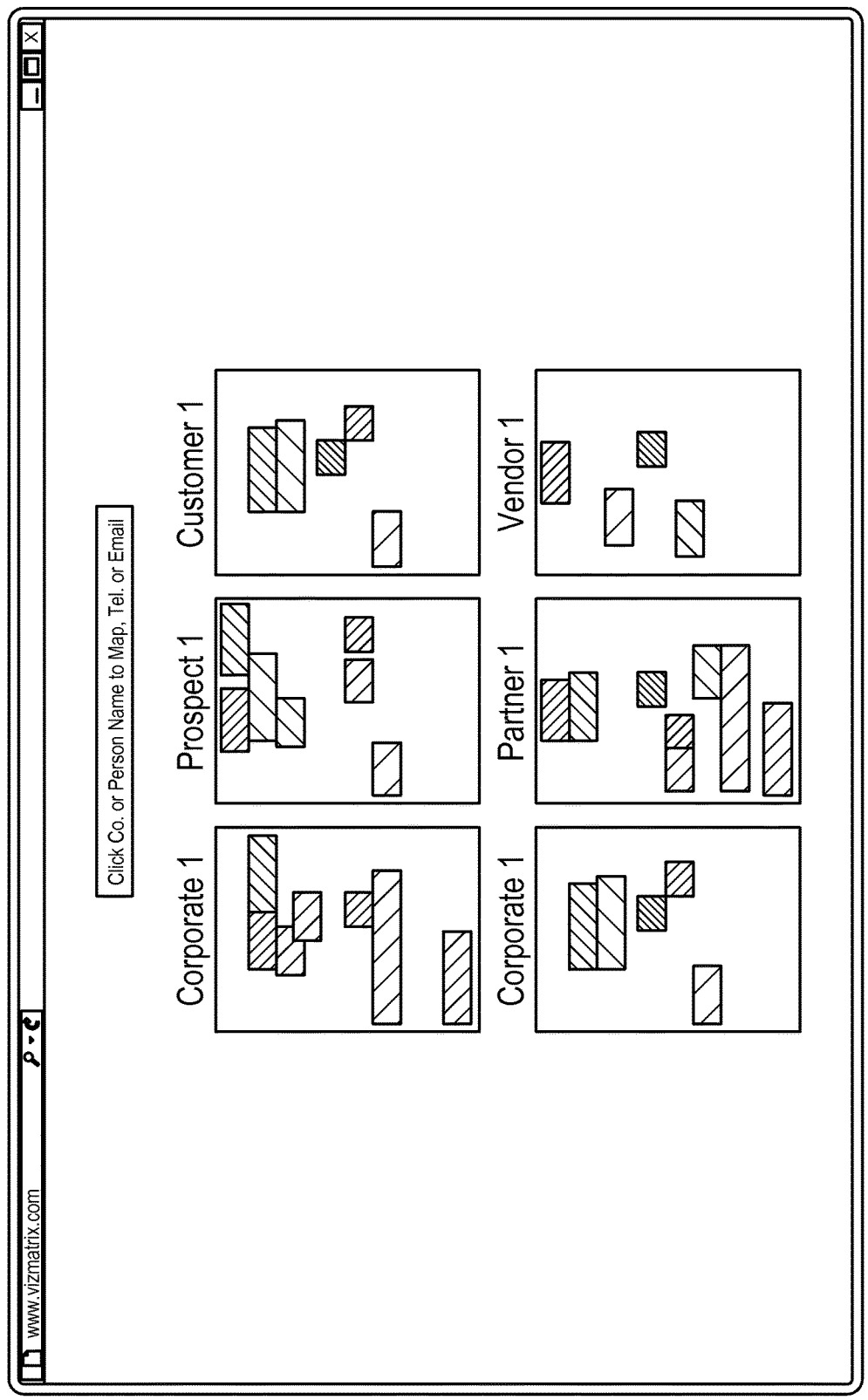

As shown in FIGS. 9-11, an exemplary system in accordance with the disclosed principles populates web-based dashboards with aggregated simulation output in a series of formats including, but not limited to, businesses by business name, industry, industry sub-segment, division, city, state, zip code or country name. Individuals may be displayed in a series of formats including, but not limited to, title hierarchy (e.g., Board members, Office and Directors, CEO/President, CFO, COO, CMO, CSO, CIO, CTO, Division or Group Presidents, Vice Presidents, Directors and Managers), profession, university graduated, university degree, affiliations and hobbies.

As seen in FIGS. 9 and 10, and further with FIG. 11, shared datasets between one or more businesses and/or individuals (i.e., entities) may appear as various connecting colored lines and/or various colored text/textboxes (illustrated as hatched or shaded boxes visually indicating matching characteristics among entities), or even font styles, associated with each business or individual connection. This provides a visual relationship of query results when presented to the end-user. Specifically, as seen in FIG. 10, the hatched or shaded boxes are illustrated without the accompanying text of the query results in order to illustrate the visual technique of the disclosed principles for providing interconnections in the query results. In actual results, the text of the query result would be provided to the end-user. FIG. 11 illustrates multiple examples of various matching query results presented to an end-user. Again the text has been removed from the visual simulations to illustrate the ease of which the colors, shading, hatching, or other means of visually demonstrating matching results provided by the disclosed principles assists end-users. Again, however, in actual matrix simulations provided to end-users, the text of the matching query results would still be provided.

Figure 12:
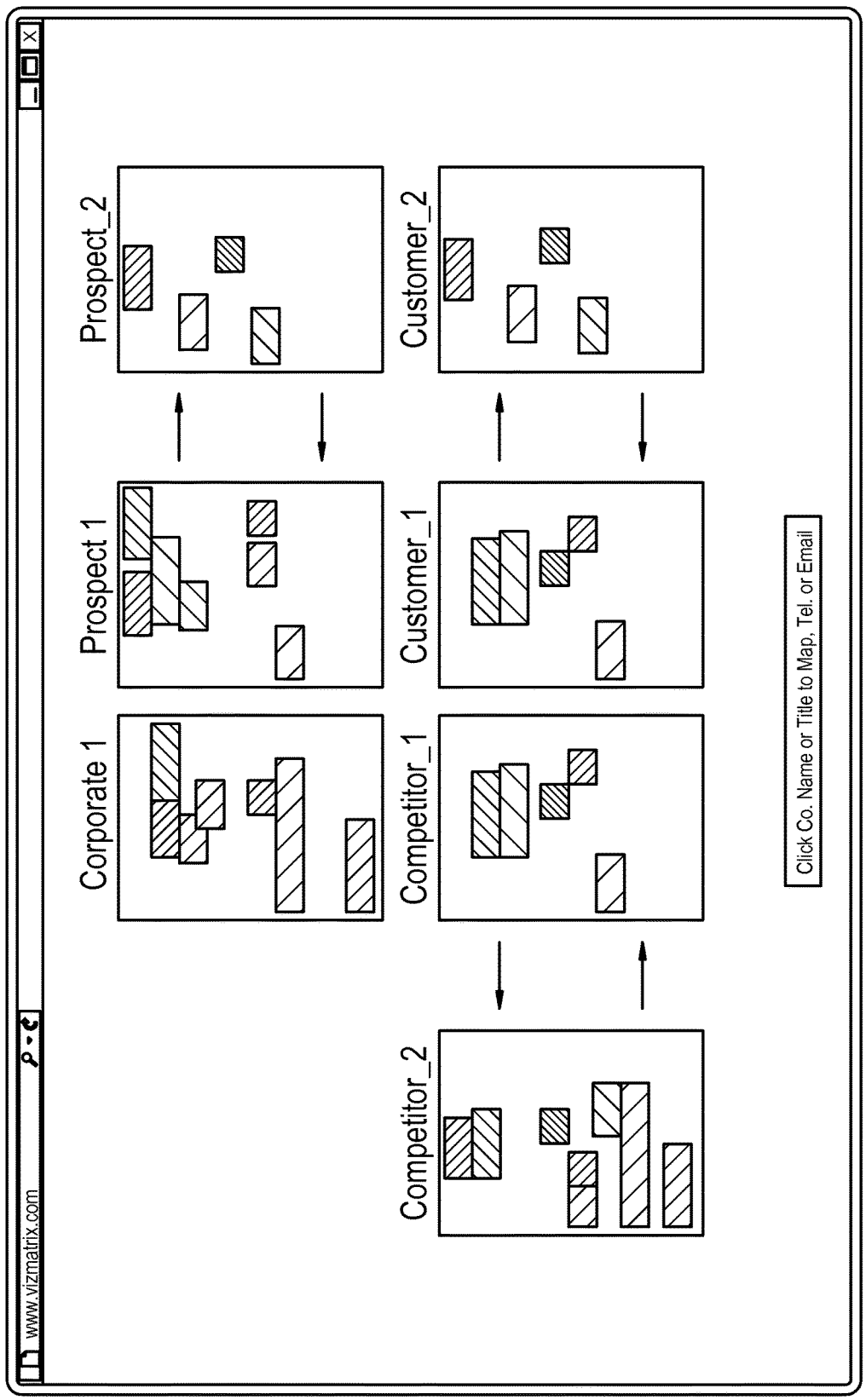
FIG. 12 illustrates an exemplary drag and drop feature on query results presented on an exemplary dashboard that allows end-users to modify or add/delete/replace query results prior to conducting another simulation.

FIG. 12 illustrates an exemplary drag and drop feature on query results presented on an exemplary dashboard that allows end-users to modify or add/delete/replace query results prior to conducting another simulation. As with FIGS. 9-11, the text has been removed from the visual simulations in FIG. 12 to illustrate the ease of which the colors or other means of visually demonstrating matching results provided by the disclosed principles assist end-users. Again, however, in actual matrix simulations provided to end-users, the text of the matching query results would still be provided.

Figure 13:
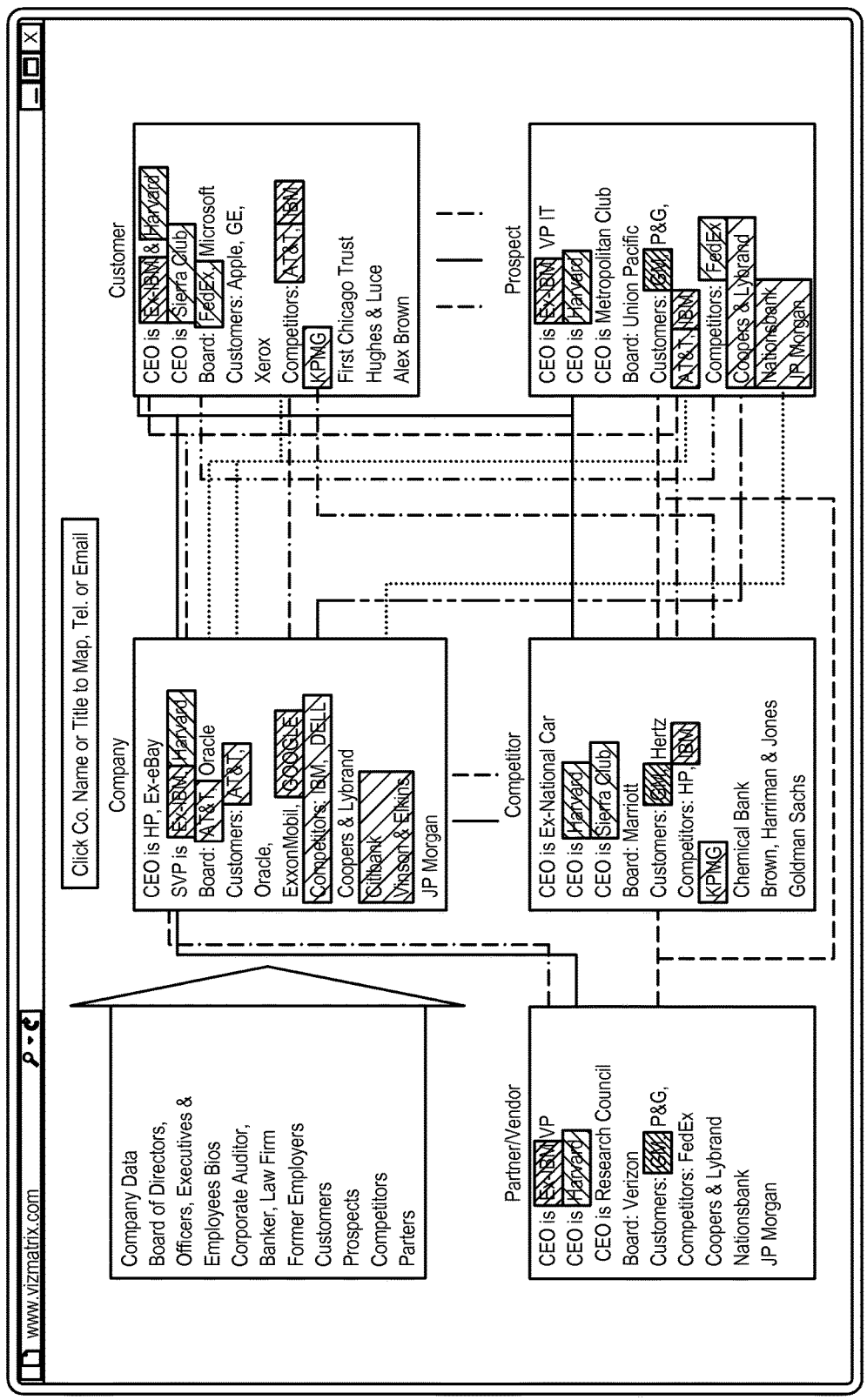
FIG. 13 illustrates multi-dimensional shared datasets of corporate, customer, competitor, and prospect executives generated by a system or method according to the disclosed principles.

FIG. 13 illustrates multi-dimensional shared datasets of corporate, customer, competitor, and prospect executives. Common factors or otherwise interrelated results are shown as multi-hatched or shaded lines, text and text blocks, and in some embodiments may be colored in matching colors as discussed above. Moreover, colored or otherwise differentiated lines may also be used to visually illustrate entities having matching characteristics, or the matching characteristics themselves. In the illustrated embodiment, various distinct lines are used to provide the visual matching of characteristics among certain entities. In interactive embodiments, end-users may hover their mouse over (or perhaps touch in a touchscreen embodiment) any business name to view pop-ups containing address, telephone and map icon (e.g., to map business location within the pop-up window). In addition, end-users may hover their mouse over business names to TAG businesses as corporate, employers, prospects, customers, partners, vendors, business consultants, investors, mergers, leads, referrals, and added SAVED to NEW or previously named MAILING LIST in a CAMPAIGN TAB. FIG. 13 also illustrates that an end-user may hover a mouse over any individual's name to view pop-up containing home office address, telephone numbers, email address and map icon (to map office location within the pop-up window). If home office data is not available, corporate address, telephone number, email address and map may be used as the default. Of course, any type of useful data may be presented by hovering a cursor over a given result, and the disclosed principles are not limited to any particular examples.

Figure 14:
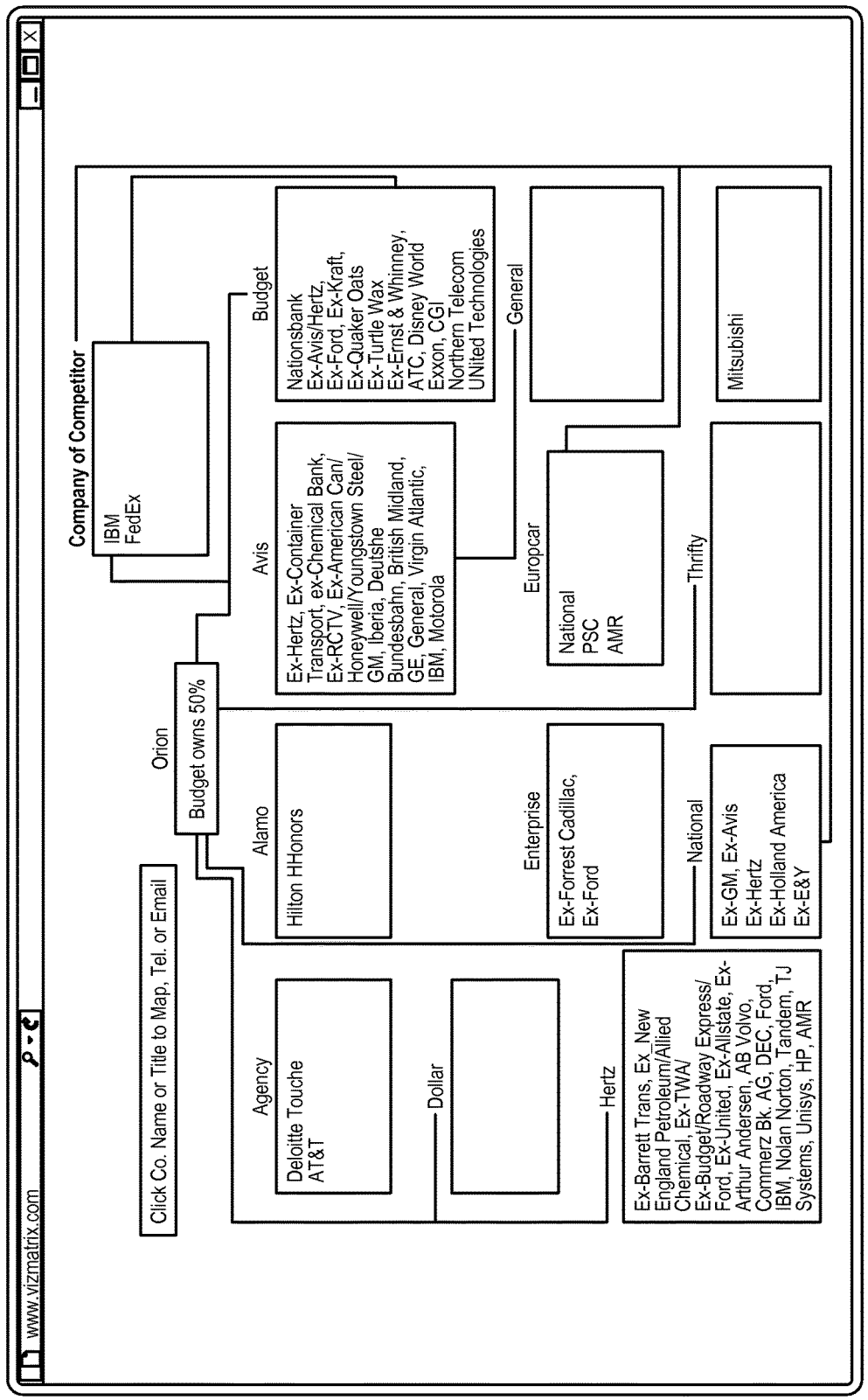
FIG. 14 illustrates an industry sub-segment view of shared datasets generated by a system or method according to the disclosed principles.

FIG. 14 illustrates an industry sub-segment view of shared datasets generated by a system or method according to the disclosed principles. Specifically, FIG. 14 provides a visual display of prospect in the rental car industry, and the interrelation of various companies in the queried area of the rental car industry. Query results are illustrated within the appropriate company within the rental car industry. With a visual matrix as shown in FIG. 14, an end-user is provided with a visual representation of the interrelations of various prospects that they might otherwise not know about to more easily conduct their research in this area. With such a visual display, end-user can thereby more assuredly target (or not target) specific prospects in this industry.

Figure 15:
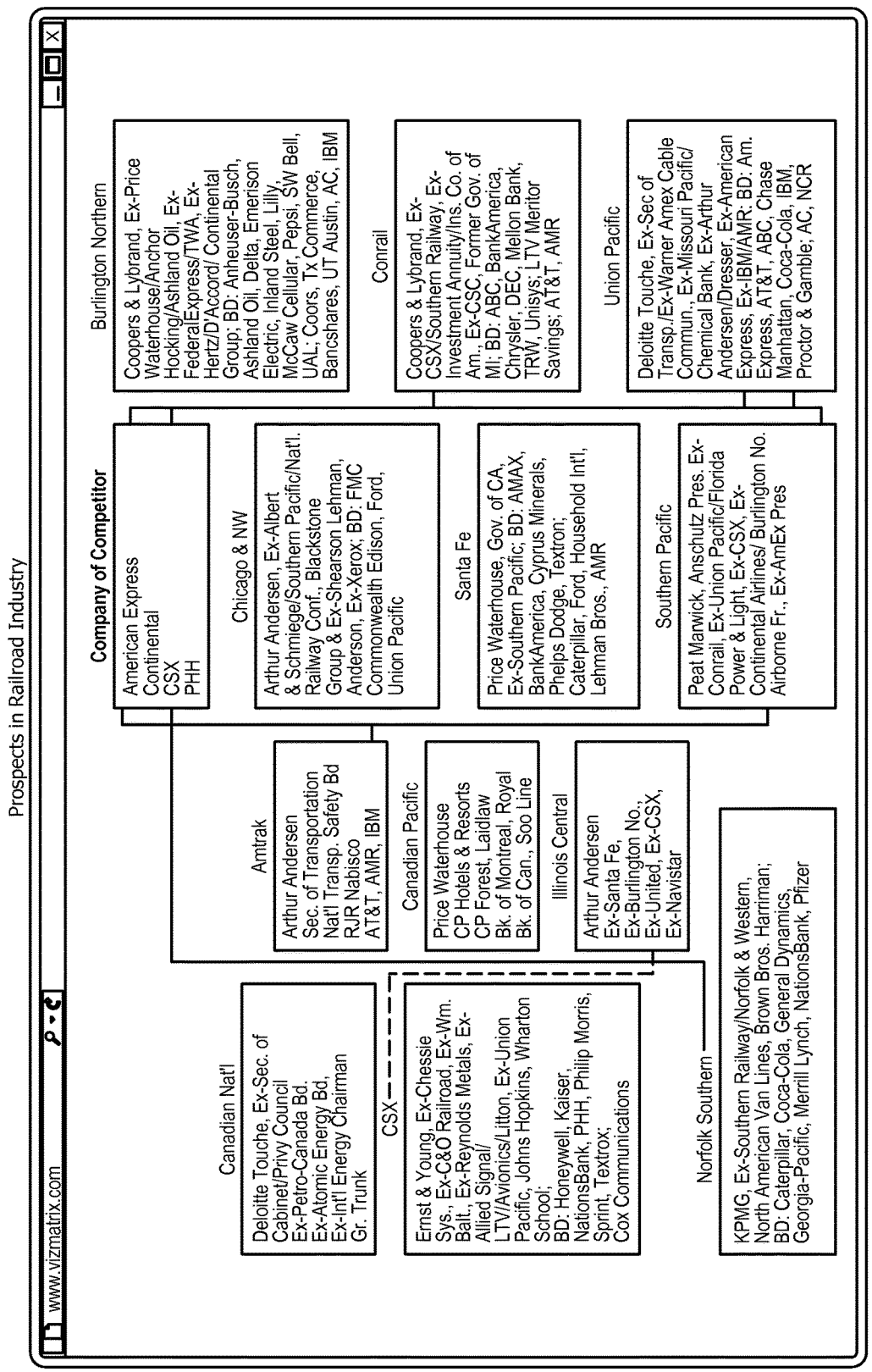
FIG. 15 provides a visual display of prospects in the railroad industry, and the interrelation of various companies in the queried area of the railroad industry, as generated by a system or method according to the disclosed principles.

FIG. 15 provides a visual display of prospects in the railroad industry, and the interrelation of various companies in the queried area of the railroad industry, as generated by a system or method according to the disclosed principles. Just as with FIG. 14, query results may be illustrated within the appropriate company within the industry. Once again, an end-user is provided with a visual representation of the interrelations of various prospects that they might otherwise not know about to more easily conduct their research in this area, and thereby target or not target specific prospects in this industry.

Figure 16:
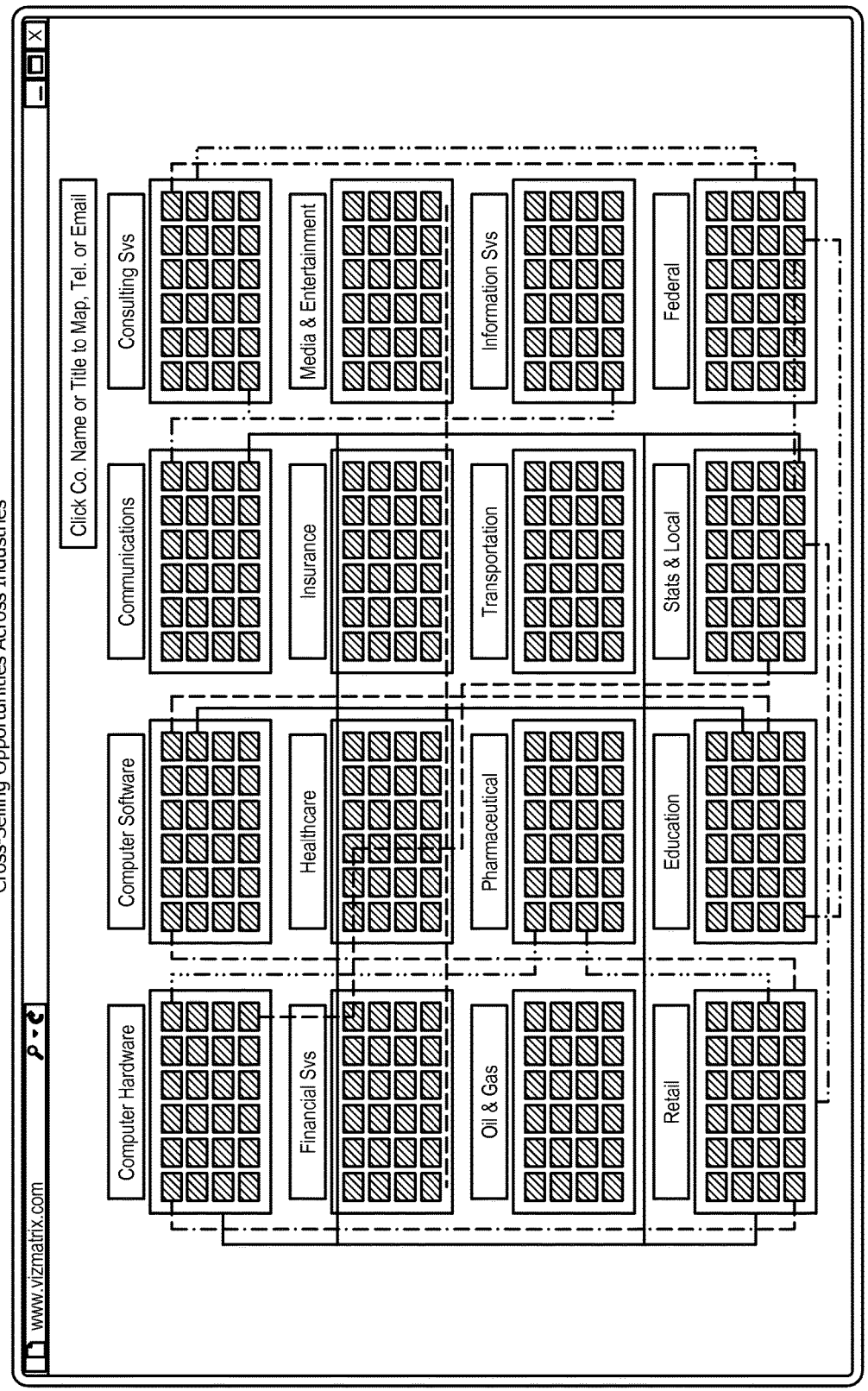
FIG. 16 illustrates a visual display of various cross-selling opportunities across multiple industries, which may be presented to a querying user in a visual matrix created in accordance with the disclosed principles.

FIG. 16 illustrates a visual display of various cross-selling opportunities across multiple industries, which may be presented to a querying user in a visual matrix created in accordance with the disclosed principles. The interconnecting lines between data elements provide a visual display to the end-user of the specific relationships, in any number of categories, between companies and persons within those companies. Moreover, the details/data elements within each of the categories that may be illustrated as interrelated using selected colors or other visual indicator can be any element populated within databases employed or otherwise accessed by a system or process of the disclosed principles. And no limitation to any particular categories or data elements, or any number of either, is intended or should be implied for a system or process of the disclosed principles.

Figure 17:
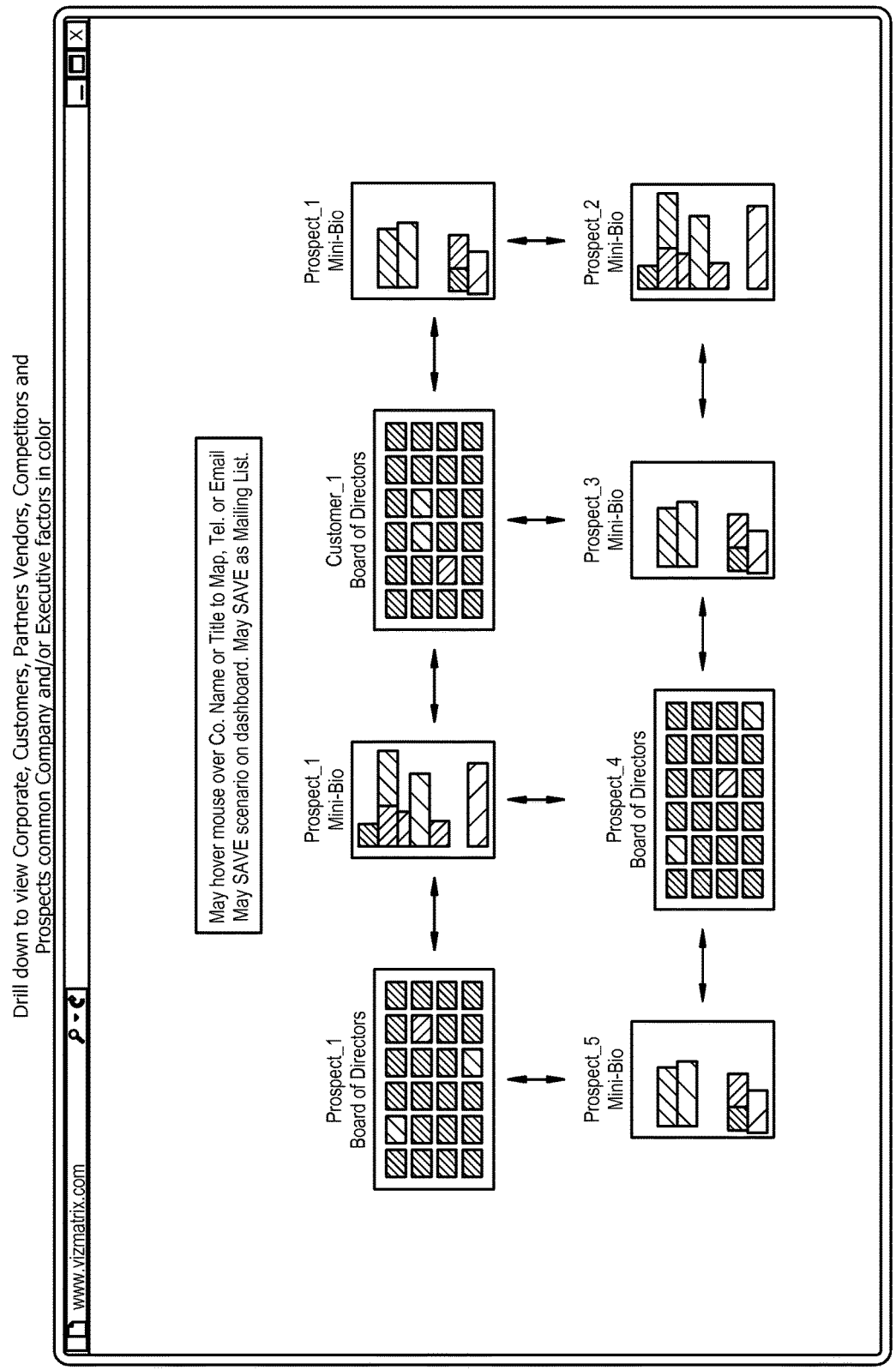
FIG. 17 illustrates the drilling down by a user to view specific relationships between companies and/or personnel, using a system or method according to the disclosed principles.

FIG. 17 illustrates the drilling down by a user to view specific relationships between companies and/or personnel, using a system or method according to the disclosed principles. In these examples, an end-user can hover over or otherwise selected one or more results/data elements to view further details on that item. For example, for the results in a query for a first Prospect, a number of members of a Board of Directors may be displayed in a visual simulation. The end-user may then select one of those potential prospects in order to view a mini-bio on that selection. The same may be done for the search for a first Customer, and then interrelated information between the potential Prospect and Customer may be visually revealed on the displayed dashboard results. The same may then be done for second, third, fourth, and fifth Prospects, as illustrated, where the interrelated details of each are easily viewed by the end-user in the visual simulation displayed to the end-user.

Figure 18:
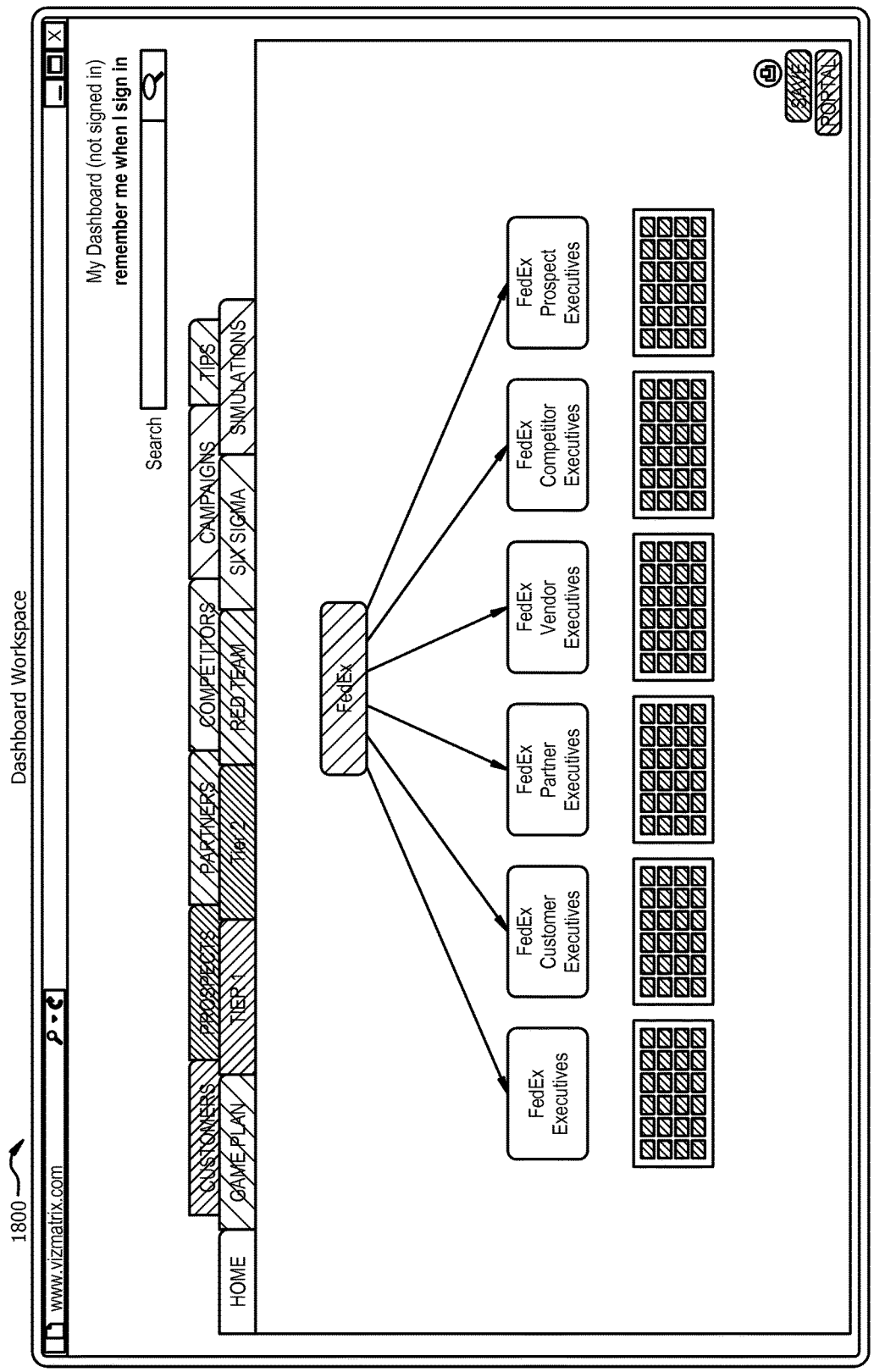
FIG. 18 illustrates an exemplary screen shot of one embodiment of a Dashboard in accordance with the disclosed principles.

FIG. 18 illustrates an exemplary screen shot of one embodiment of a Dashboard 1800 in accordance with the disclosed principles. The exemplary Dashboard 1800 may be accessible by a user, in this example, setting forth details regarding FedEx® as a business prospect. On such a Dashboard 1800, a number of Tabs may be provided for the end-user's selection. For example, the Dashboard in a system as disclosed herein may allow a user to search for Customers, Prospects, Partners, Competitors, and Vendors. In addition, a Home Tab, as well as a number of project-specific Tabs may be named by end-users of the Dashboard and used as a means to store saved searches. And certainly any type of Tab may be included in a Dashboard implemented as disclosed herein.

At this stage of the end-user's exemplary search, the Prospect is FedEx®. Among the FedEx® umbrella, results displayed to the user include FedEx® executives, as well as customer, partner, vendor, and competitor executives. For each of these exemplary categories, a visual matrix may be displayed from which the end-user may make selections. As discussed above, each such selections allows the user to dig deeper into the details of such selections, as well as provide the user with interrelations, such as color lines, text, or shaded boxes, among one or more selections in relation to keywords or other preferences chosen by the end-user during their search. Each such selection may further cause one or more displays like those illustrated in any of FIGS. 9-17.

Figure 19:
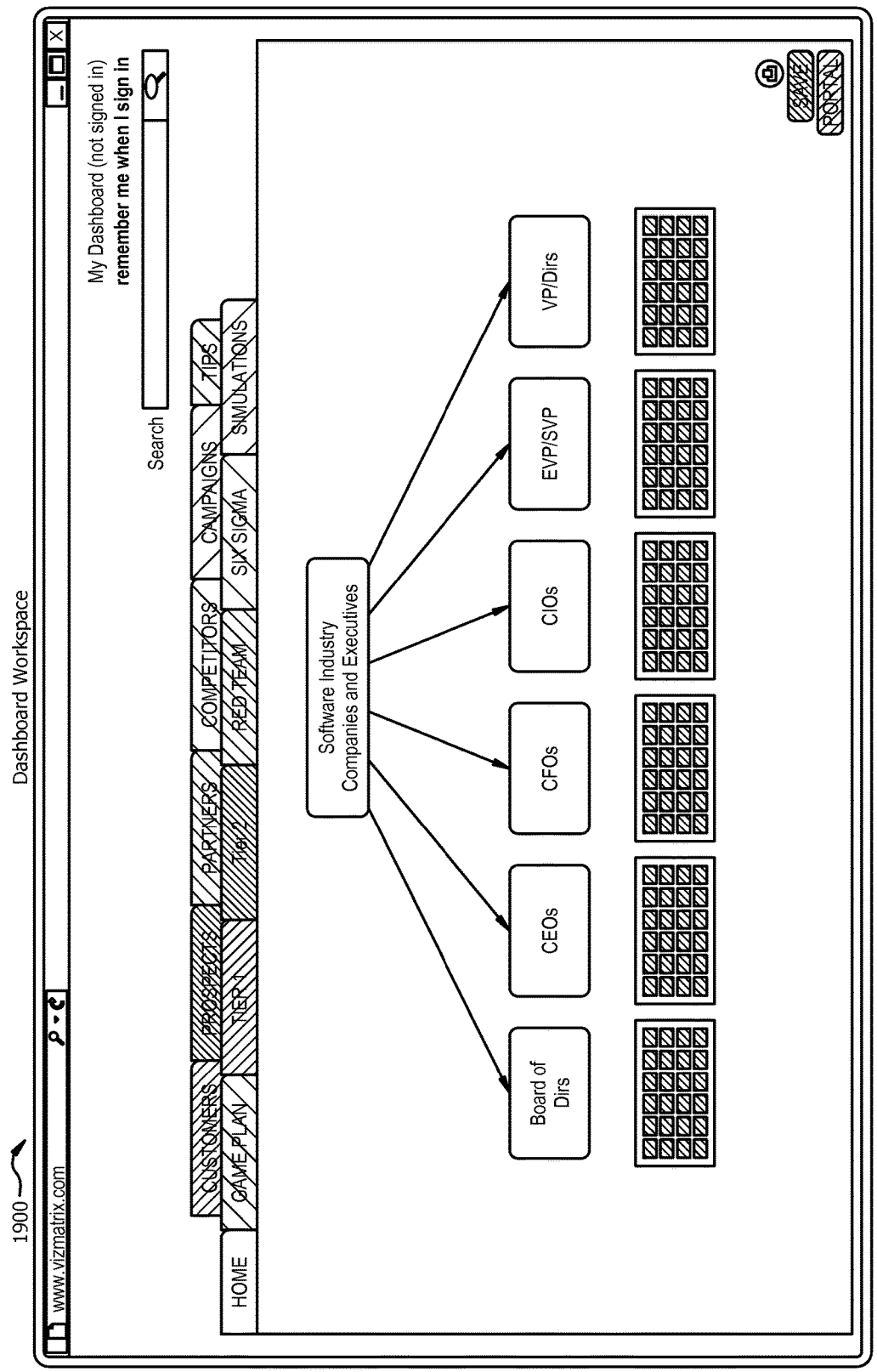
FIG. 19 illustrates another exemplary Dashboard according to the disclosed principles and accessible by a user, which sets forth details regarding software industry companies and executives.

FIG. 19 illustrates another exemplary Dashboard 1900 according to the disclosed principles and accessible by a user, which in this example sets forth details regarding software industry companies and executives. In this end-user's exemplary search, the search is for multiple Software Industry Company's Executive by Title, which could be a search for a Prospect, a Customer, a potential Partner or even a Competitor. Among this umbrella, results displayed to the user include software industry members of Boards of Directors, CEOs, CFOs, CIOs, executive or senior vice presidents, and vice presidents or directors in a company. As before, for each of these exemplary categories, a visual matrix may be displayed from which the end-user may make selections. And as discussed above, each such selection allows the user to dig deeper into the details of such selections, as well as provide the user with interrelations among one or more selections in a further visual display.

Figure 20:
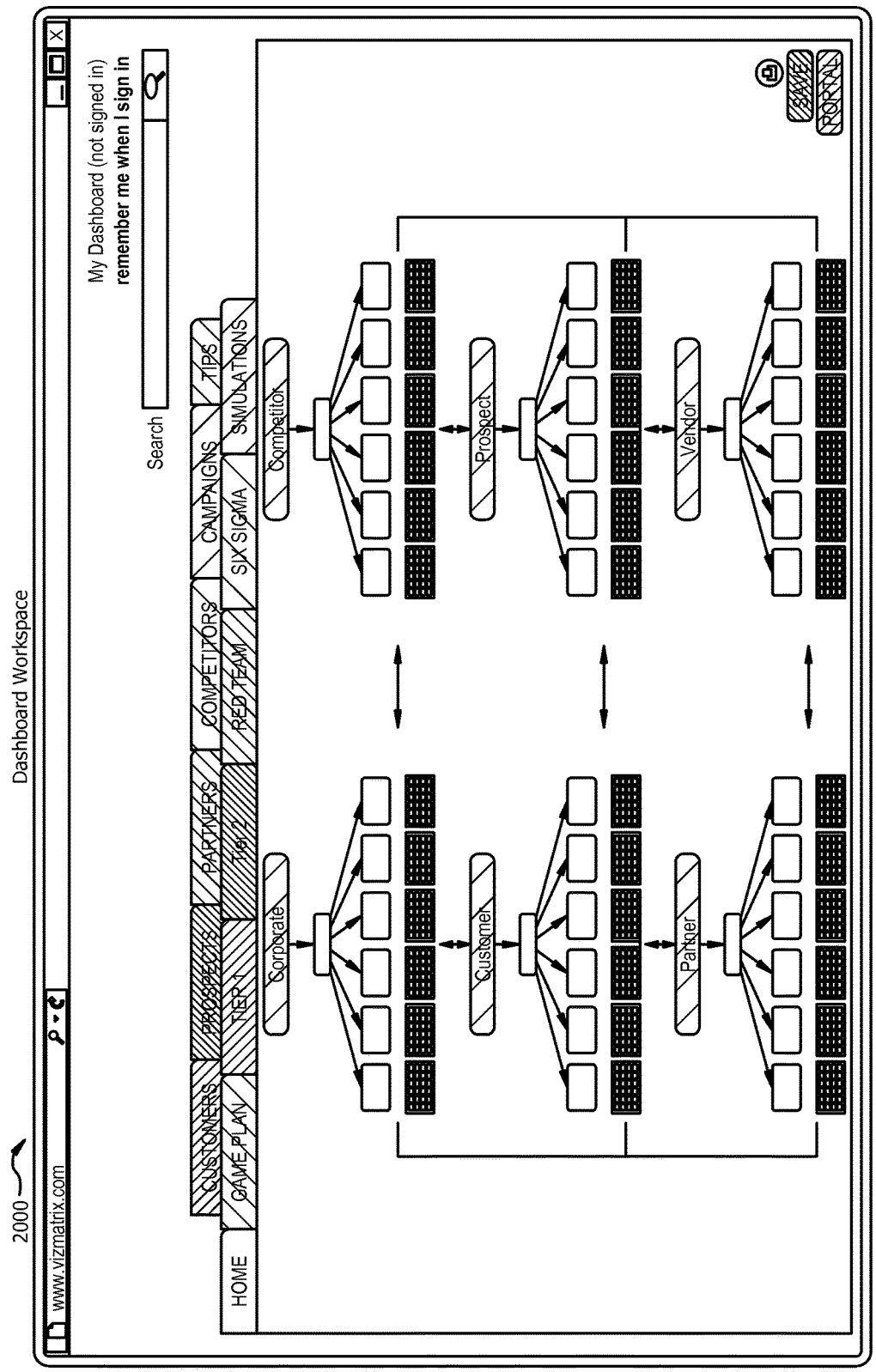
FIG. 20 illustrates an exemplary Dashboard in accordance with the disclosed principles displaying to a user the interrelationships between a specific entities being searched, and the specific relationships that a company has in a number of variously illustrated categories.
Figure 21:
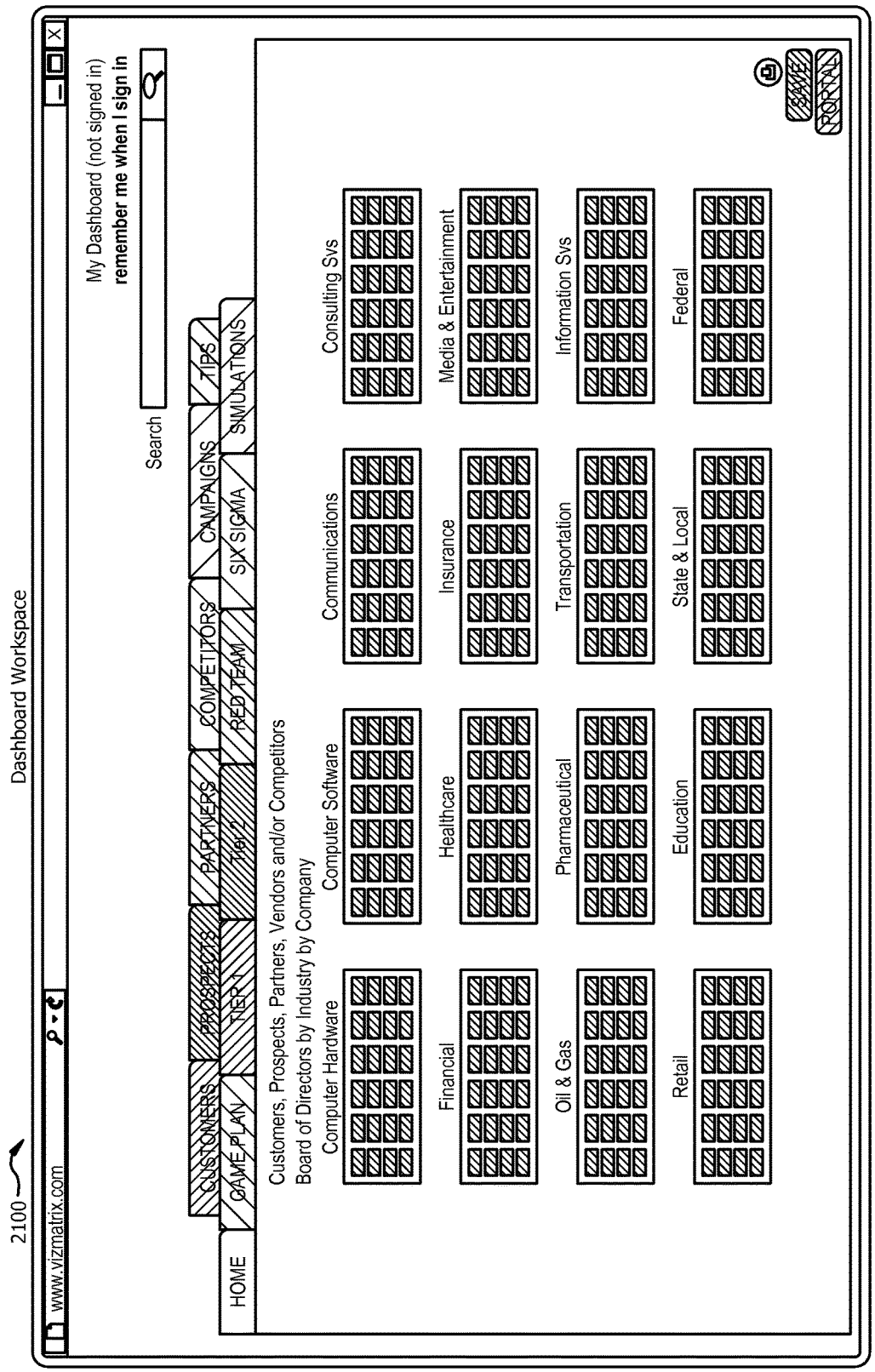
FIG. 21 illustrates another exemplary Dashboard displaying to a user various prospects in the various illustrated industries.

FIG. 20 illustrates an exemplary Dashboard 2000 displaying to a user the interrelationships between a specific entities being searched, and the specific relationships that a company has in a number of variously illustrated categories. All such data may be provided to a user with a system or process in accordance with the disclosed principles simply by entering the name of a particular entity, or perhaps by clicking on a specific entity that was displayed as a result of a prior search. Of course, the exemplary categories illustrated in this Dashboard 2000 are not required for all searches, and instead alternative or additional categories may also be provided using a system or method as disclosed herein. FIG. 21 illustrates another exemplary Dashboard 2100 displaying to a user various prospects in the various illustrated industries.

Figure 22:
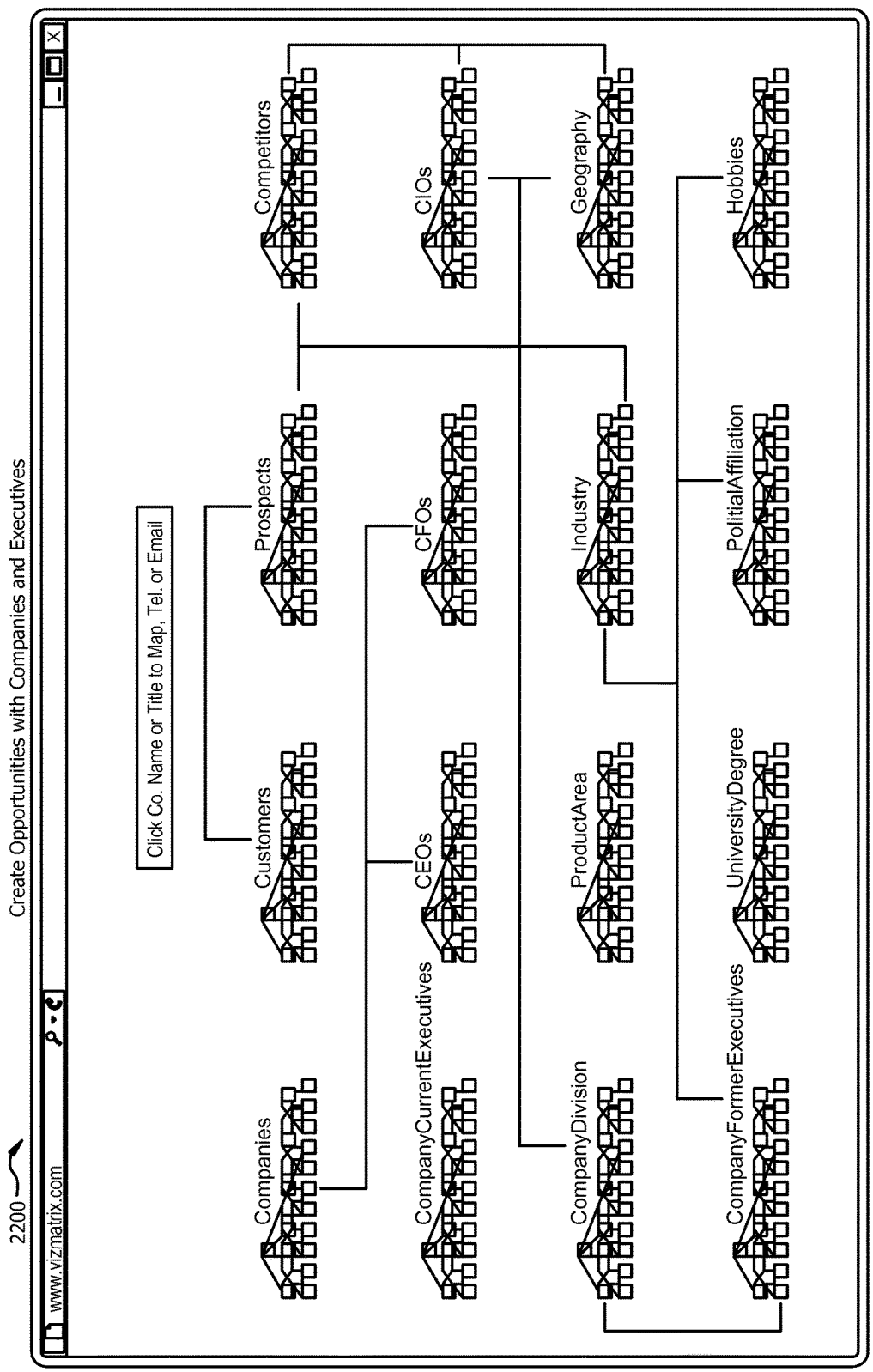
FIG. 22 illustrates a conceptual diagram depicting how a system or method in accordance with the disclosed principles may be implemented to provide any number of various opportunities with both companies and individuals based on the specific goals of the end-user of the system or method.

FIG. 22 illustrates a conceptual diagram 2200 depicting how a system or method in accordance with the disclosed principles may be implemented to provide any number of various opportunities with both companies and individuals based on the specific goals of the end-user of the system or method. Interrelations between companies and/or individuals are revealed to the user with the disclosed principles, as well as the interrelationships within each of the categories of companies, individuals, industries, locations, etc. The diagram 2200 visually illustrates how the disclosed principles provide query results of the relationships among and within such companies/individuals, and thus provides the end-user the information needed to leverage these relationships into business opportunities or other desired goals.

Figure 23:
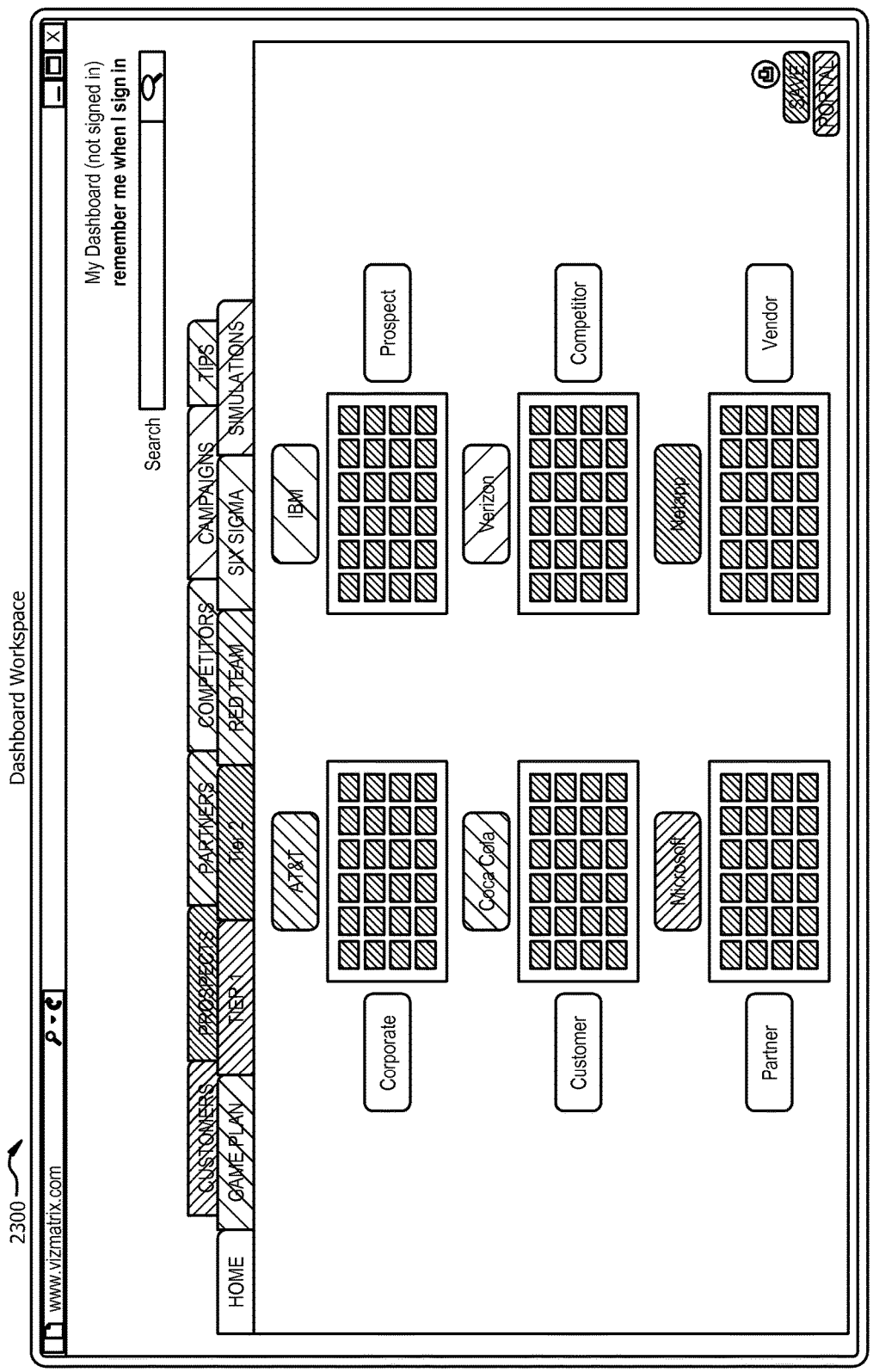
FIG. 23 illustrates a sample end-user HOME dashboard in accordance with the disclosed principles.

FIG. 23 illustrates a sample end-user HOME dashboard 2300 in accordance with the disclosed principles. The "last" simulation conducted by the end-user may appear on this initial dashboard "as a reminder" of the last simulation run by the user. A tab labeled HOME takes the user to such a personalized HOME dashboard 2300. Other TABs at top of dashboard are areas the end-user may save, name, and store simulations by project or topic. End-users may give a simulation a NAME and SAVE it on the dashboard as a new TAB or within an existing TAB at the top of page. The user may move Tabs to new locations (drag & drop) at the top of dashboard, if desired, and rename them at the top of Dashboard as they prefer. The user may also drag, for example, multiple IBM® strategies (TABS) into a single IBM® TAB. Named and saved strategy simulations may also be automatically filed in a TAB labeled Simulations such that the user may select one of them again at a later time. Individual Dashboards reflect the most promising opportunities, strategies, plans, insights, and relationships generated by a system as disclosed herein, and therefore providing such customization is advantageous to end-users of a system as disclosed herein.

Figure 24:
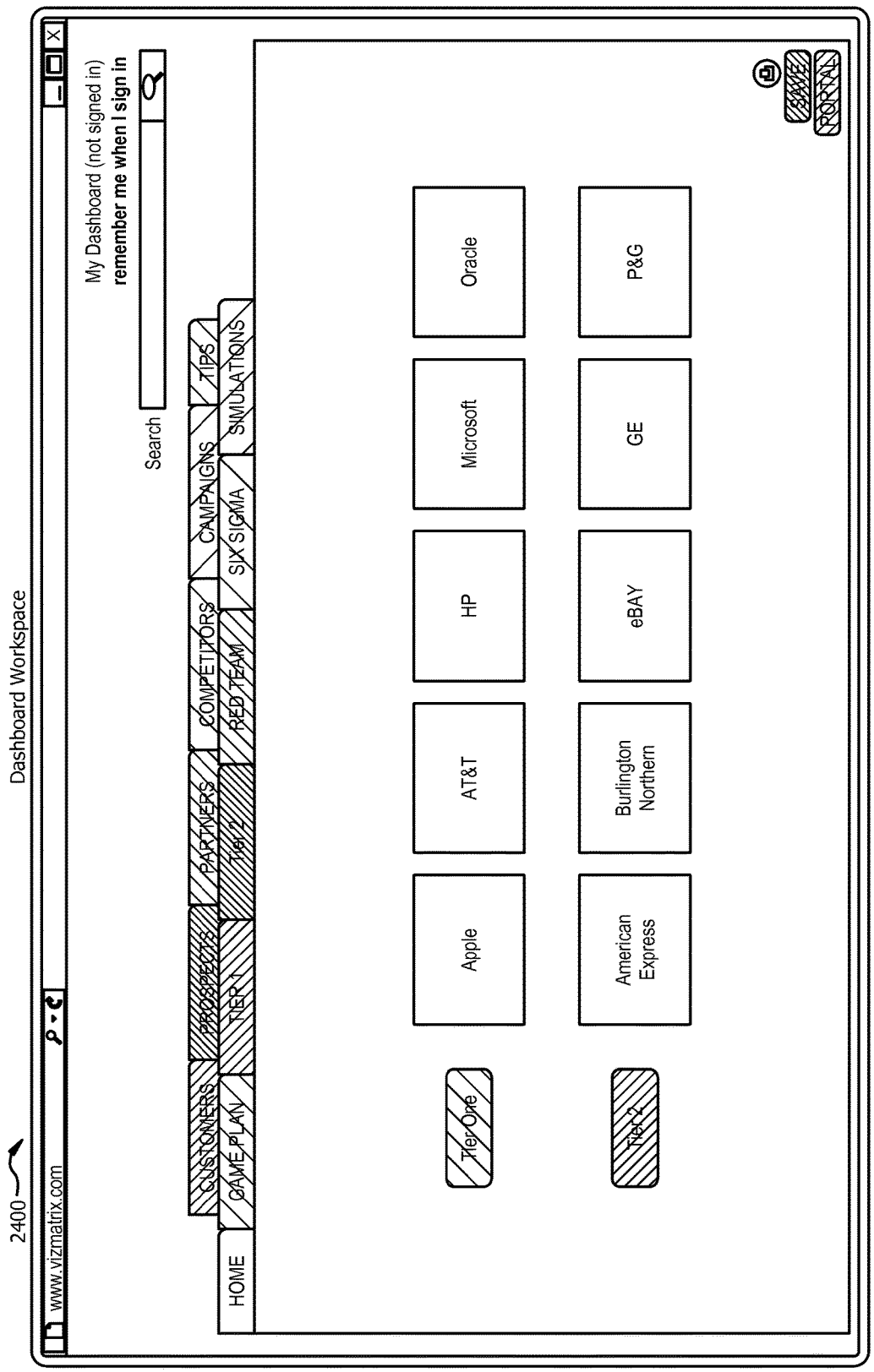
FIGS. 24 and 25 illustrate sample Corporate Dashboards provided in accordance with the disclosed principles.
Figure 25:
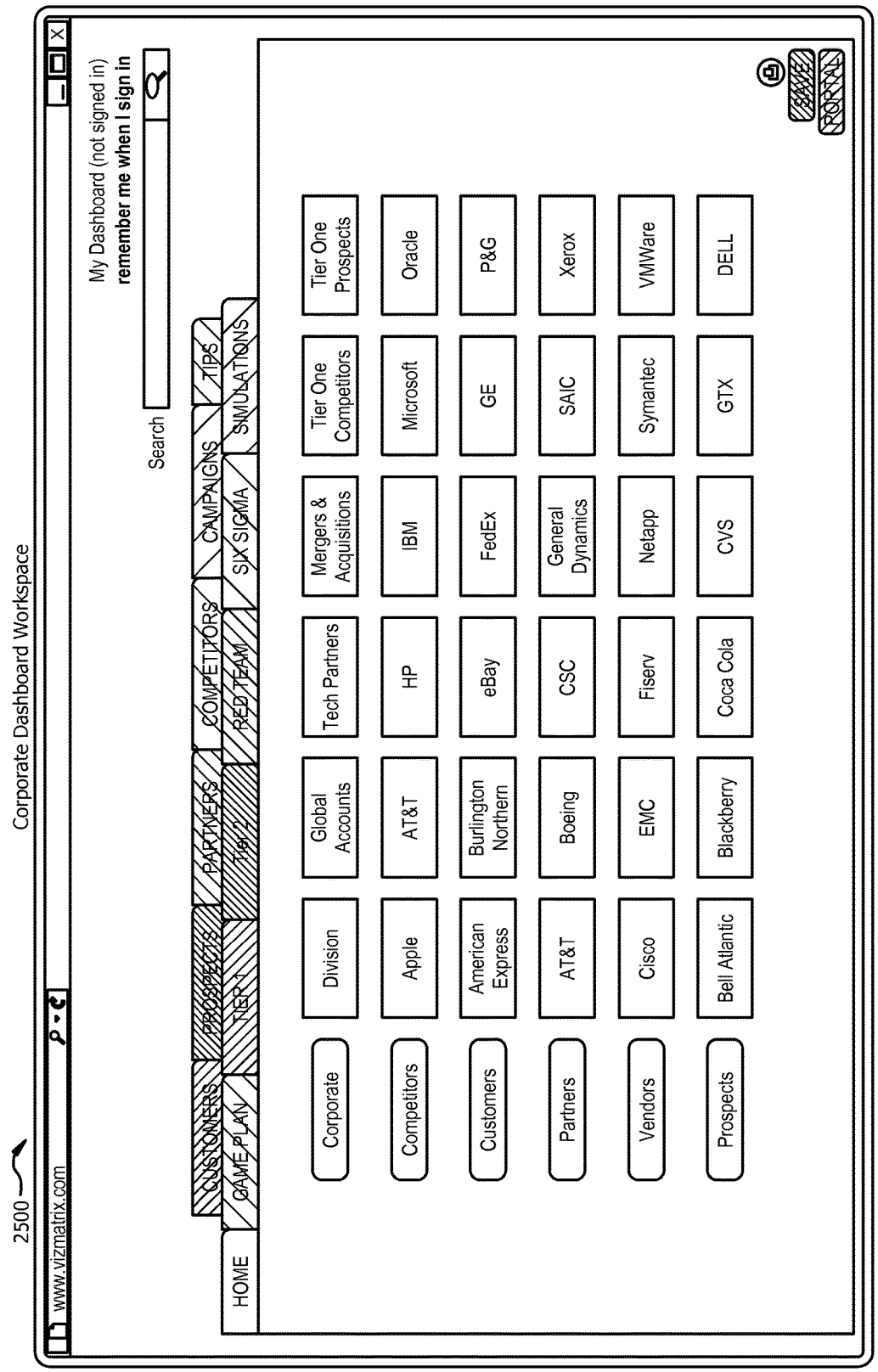

FIGS. 24 and 25 illustrate sample corporate Dashboards 2400, 2500 provided in accordance with the disclosed principles. Each such Dashboard may be customized by each end-user for their own purpose so as to illustrate the information on companies and/or individuals that is most helpful to the user's goal. As illustrated, this may include customizing a Dashboard to display not only corporate prospects, but also each of those prospects' competitors, customers, partners, vendors, and even prospects of those prospects. FIG. 24 illustrates a ranking of certain results in a user's Dashboard by importance, specifically, as Tier One and Tier Two results. As with all Dashboard results, the user may select specific results to dig deeper into the search results. FIG. 25 illustrates aggregation, manipulation, and display of search results into a Game Plan divided into various useful categories to help a user determine the interrelations of specific search results. By aggregating and manipulating the provided by the disclosed principles, in the manner disclosed herein, users can create such a Game Plan to target prospective companies or individuals based on the discovered interrelationships provided by the disclosed principles.

Figure 26:
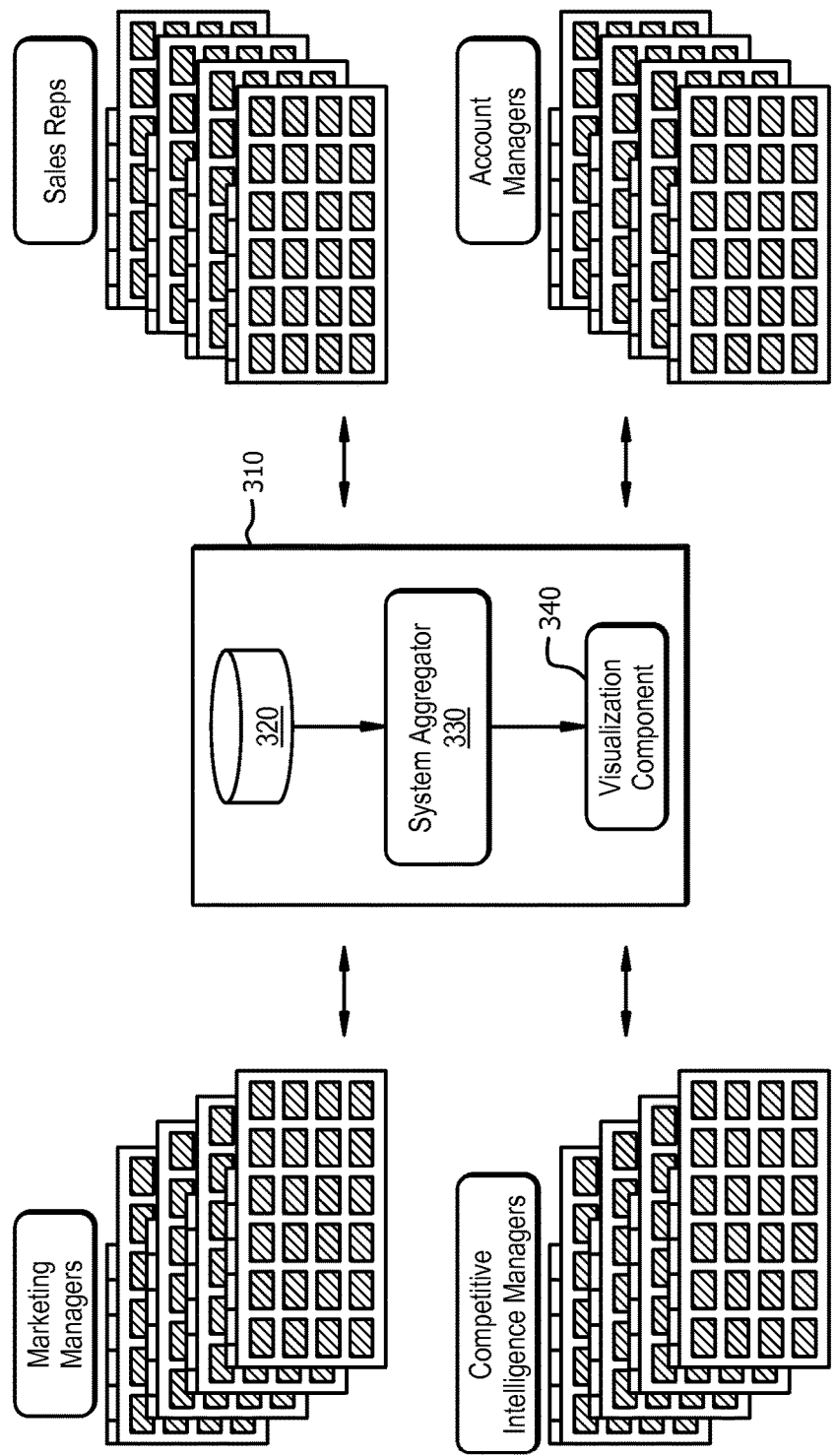
FIG. 26 illustrates an exemplary embodiment of a multi-functional Dashboard workspace where multiple results for specific queries can be displayed in layers for access and review by a user, in accordance with the disclosed principles.

FIG. 26 illustrates an exemplary embodiment of a multi-functional Dashboard workspace 2600 where multiple results for specific queries can be displayed in layers for access and review by a user. A system 270 according to the disclosed principle, such as the system 270 discussed with reference to FIG. 2, is illustrated as providing the layered matrices for display to the end-user. As with other embodiments disclosed herein, the user may then further manipulate these results to discover details and interrelations among various query results. Also as before, color coding or other visual indicators may be used in the display(s) to indicate such interrelations to the end-user, which provides more efficient leveraging of professional and personal information for the user's query goals.

Figure 27:
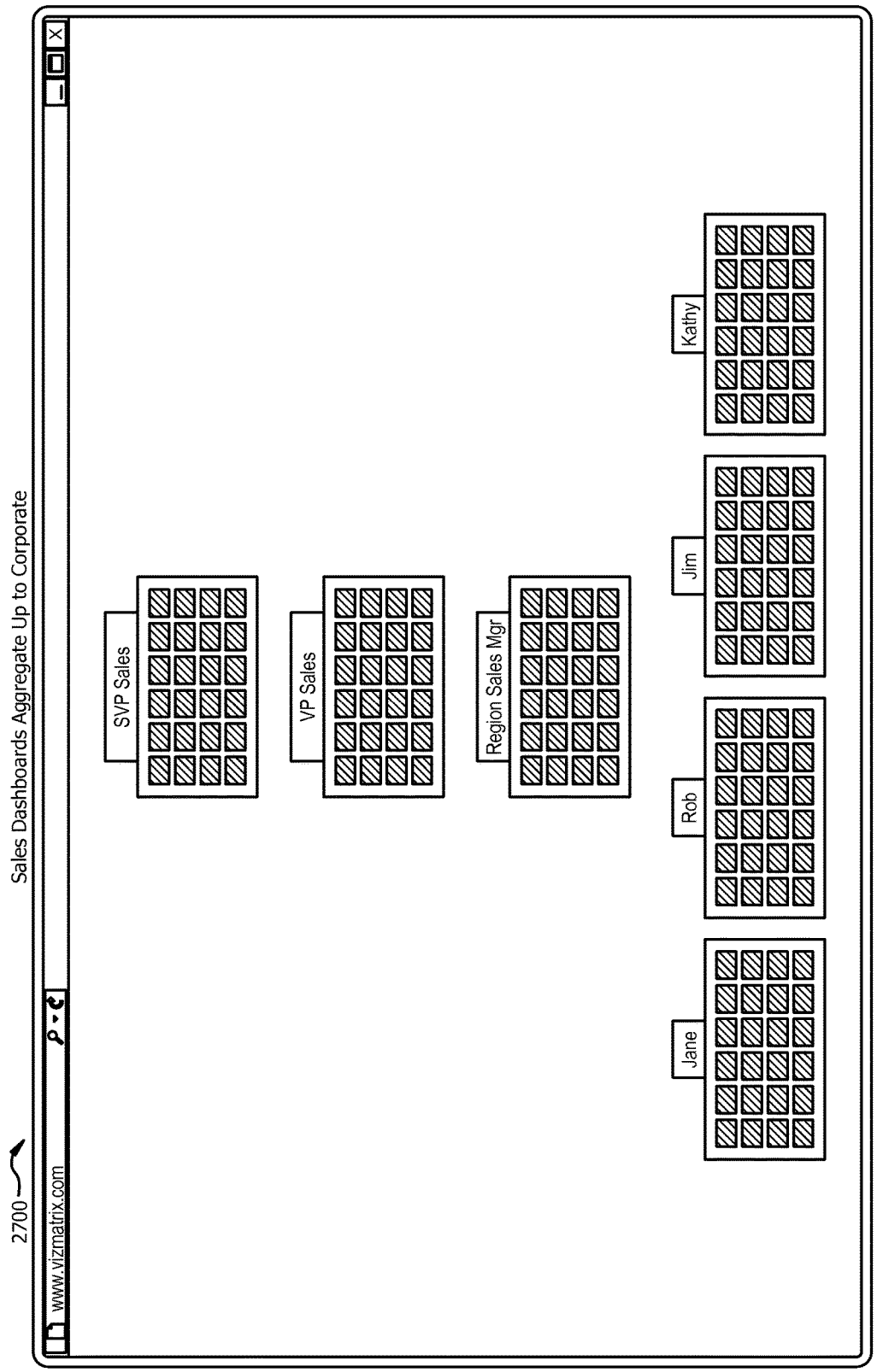
FIG. 27 illustrates an exemplary embodiment of aggregated sales data visualized in a hierarchy of Dashboards for display to a user, in accordance with the disclosed principles.

FIG. 27 illustrates an exemplary embodiment of aggregated sales data visualized in a hierarchy of Dashboards 2700 for display to a user. Specifically, in a query by the user regarding a sales force, the query results may be displayed to the user in a hierarchy. In this example, a matrix of senior vice presidents is displayed at the top of the hierarchy, with vice presidents of sales listed below the senior vice presidents, and with regional sales managers below the vice presidents. At the bottom of the hierarchy, individual sales representatives may be presented on distinct Dashboards for display to the user. In each matrix in the hierarchy, individual results are displayed in distinct matrices, and each such results may be selected by the user to discover additional details, as discussed in detail above.

Figure 28:
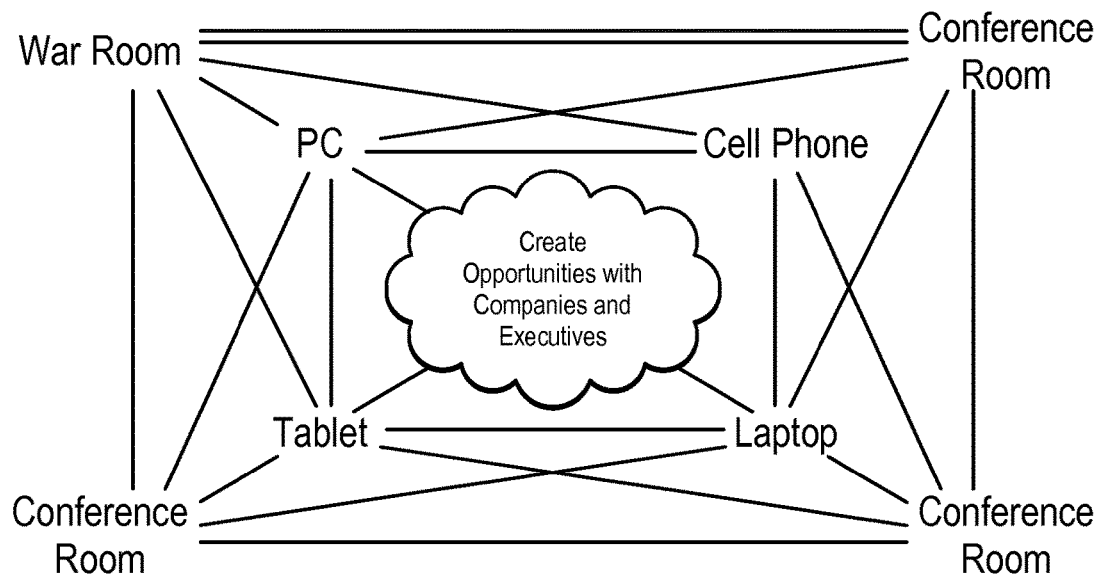
FIGS. 28 and 29 illustrate examples of how a system or method in accordance with the disclosed principles may be implemented in team and cross-selling environments.
Figure 29:
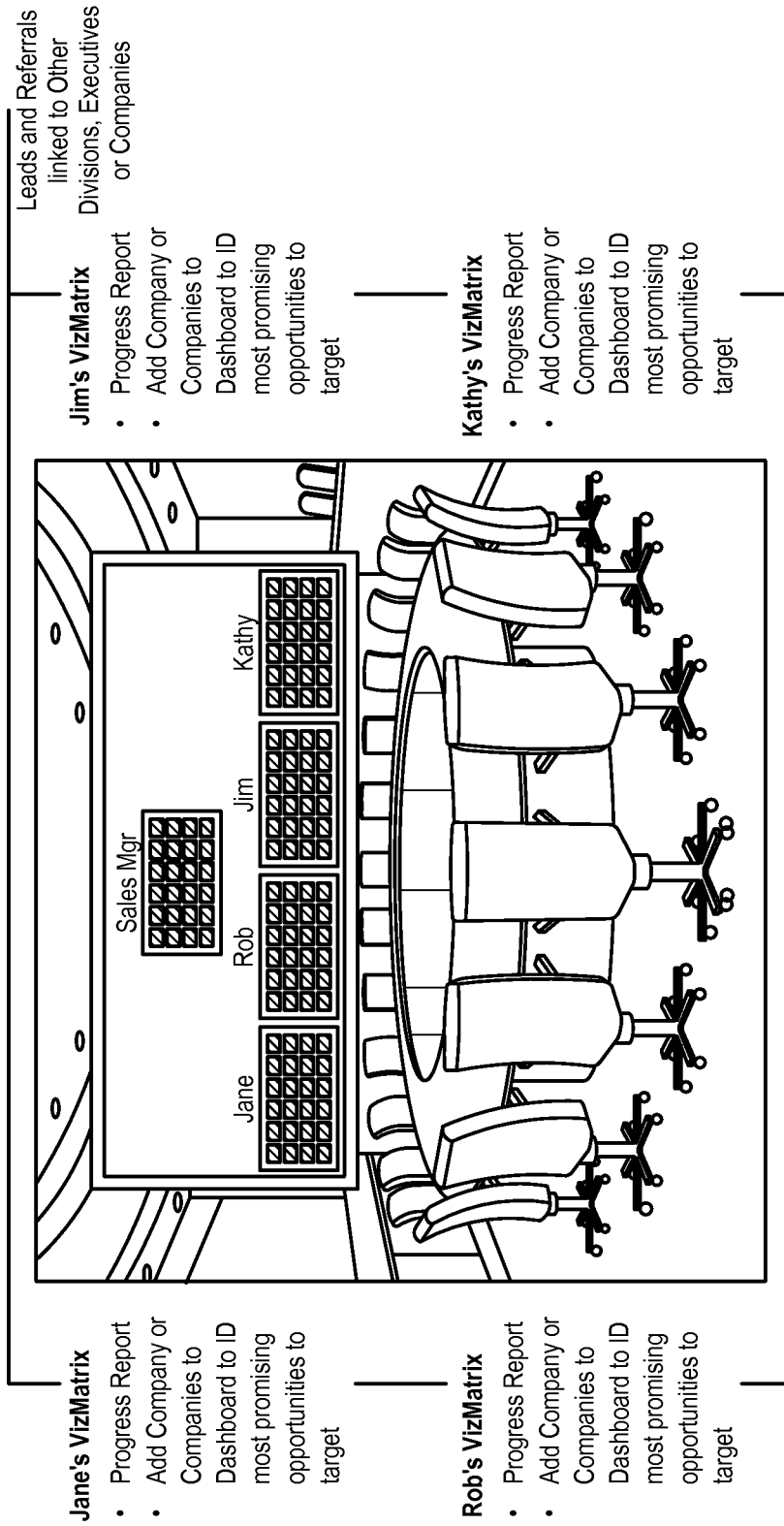

FIGS. 28 and 29 illustrate examples of how a system or method in accordance with the disclosed principles may be implemented in team and cross-selling environments. FIG. 28 illustrates the interconnection of devices that may be used with a system or method as disclosed herein, as well as with more than one end-user. Moreover, the resources offered by the disclosed principles may be provided to various locations, as needed, within a single company. In short, the disclosed principles allow users to develop opportunities anytime, anywhere, and on any type of device.

FIG. 29 illustrates a specific embodiment of an exemplary use of the disclosed principles within a company's conference room and by multiple users of that company. Specifically, each of these various users (Jane, Rob, Jim, and Kathy) can each employ the disclosed principles to discover promising opportunities to target. Those results may be displayed in easy-to-read visual simulations or matrices that quickly and clearly illustrate the interrelationships of discovered opportunities or other results. Advantageously, such access may be done in real time during a conference room meeting, and thus those potential opportunities can be immediately revealed and discussed. Furthermore, there is no limitation to the number of users (or locations) within a specific company that may employ a system in accordance with the disclosed principles, nor to the time(s) at which such users may choose to employ such a system.

Below is a list of exemplary combinations of factors that may comprise queries that may be performed using a system or method in accordance with the disclosed principles, which allows users to actually visualize the results of creative combinations of companies, individuals, locations, financial information, personal information, and virtually any other empirical factors:

- Companies (Prospects, Customers, Partners, Competitors, Vendors) x Geography
- Executives at Microsoft® in Seattle
- CEOs, CFOs, CIOs, VPs with Smartphone expertise in Europe
- CIOs in Florida who play Golf
- ORACLE® Account Managers
- VPs/Directors of Development of Entertainment Companies in Los Angeles
- Employees who previously worked at HP®
- Employees inside or outside the company with Software Design expertise
- Harvard Grads at AT&T® in New Jersey
- Republicans making over $100,000/year in Texas
- Fortune 500 Executives making over $500,000/year Of course, the above examples are only merely exemplary of the almost limitless combinations of queries that may be provided by a system or method in accordance with the disclosed principles.

Below is a list of exemplary values that may be obtained using a system or method in accordance with the disclosed principles:

- Identifies REAL-TIME Strategic Sales Entry Points & Influencers within a user's or a competitor's Company, Customers, Prospects & Partners to:
  - Grow Existing Business
  - Grow New Business
  - Target New Prospects, Customers, Partners and Mergers & Acquisitions
  - Go after "low hanging fruit"
  - Focus Senior Executives and Sales Force on most promising prospects
  - Build Immediate Referral base & Revenue Stream
  - Manage Corporate, Division & Sales Force Sales Growth
- Identifies executive relationships inside & outside the company
- Identifies and qualifies executive relationships you and your competitors may leverage on "the same" opportunities
- Allows executives & account managers to grow accounts horizontally by cross-selling into other divisions and geographies
- Allows opportunities to attain business without the need to compete on RFPs
- Allows executives and other personnel to quickly locate decision-makers inside and outside a company Promotes cross-selling, teamwork & productive strategy meetings across the company Increases sales and marketing productivity Reduces sales and marketing operating costs Facilitates allocation of resources in the most promising areas Establish a winning sales force, sales targets, territories and marketing campaigns Eliminates paper chases and cold calling Transforms sales executives into consultants and marketing analysts into business planners and strategists Optimizes use of executive management time and resources more efficiently Provides a framework, methodology and automated system and methodology to facilitate opportunity creation with companies and executives Identifies, qualifies and creates opportunities Highlights companies and executives you and your competitors may be leveraging on "the same" opportunities Focuses entire enterprise on most promising opportunities Automates strategy and planning processes

EXEMPLARY SCENARIOS

Various embodiments of implementations of the disclosed principles may be suitable for various use scenarios. What follows are six exemplary use scenarios described in detail. However, it should be appreciated that these scenarios are by way of example only, and many other use scenarios may be contemplated for the various embodiments of the disclosed principles as previously described.

Scenario 1

Jack is a CEO and 1586 Harvard graduate. He wants to host a golf tournament and invite some CEOs who also attended Harvard as a means to drum up some new business in multiple industries. Jack opens a dashboard to his home dashboard. He clicks on a button titled "portal." A pop-up window appears for him to select "name", "title", "industry" "geography," etc. Jack selects "title" and a list of titles appears. He selects "CEO." He also selects "current and former" CEOs to expand his search. Jack selects the "industry" tab and selects "high technology" from a list of industries. He then selects the "university" tab and types in the word "Harvard." In the hobby field, Jack types "golf." Jack then selects button at bottom of portal window titled "Matrix" to initiate simulation model.

The disclosed principles generate a Query Pop-Up Webpage that begins to fill in CEO names, Company Names (current and former employers), etc. When the simulation is complete, 100 CEOs with shared datasets (in accordance with Jack's search criteria) appear on Jack's dashboard. Several shared data colored lines and colored text get his attention. Jack finds himself among the CEOs who attended Harvard. His company name is highlighted in RED. Then, as a matter of fact, he sees some of the CEOs held former executive positions at his company. He is amazed that he didn't know they were Harvard graduates. Jack also discovers some CEOs have moved around from one High Technology company to another. This gives him some additional strategic entry points to gain new business in multiple industries. Jack also sees several of the CEOs worked at companies that are his customers. Jack hovers his cursor over the name of one of the CEOs to see an "expanded view" of an entire list of affiliations and hobbies. He sees the CEO also plays tennis.

Jack SAVES the simulation in a previously named SIMULATION folder on his dashboard. He labels the simulation "Harvard Golf CEOs." He may rename and move the SAVED simulation later. He tells his Marketing Department (Events Management) about his experience using the simulation system to locate High Technology CEOs who play golf. Marketing begins to use the system to conduct targeted email, mail, telephone, and/or marketing campaigns to connect or influence employers, prospects, customers, competitors, partners, vendors, business consultants, investors, mergers, current and former employees by industry and geography.

Scenario 2

A corporate strategy director is conducting competitive research. He runs a simulator of two competitors by product and service areas and discovers they beat his company into the new Internet services market. He delivers his simulation findings to his management team. The management team decides to form a new Internet division and service. They would like the stock market and external analysts to rank their decision favorably. They ask the Human Resources Department to see if the company has any employees in other divisions who have Internet-related skills in the new service line. HR runs simulation scenarios and finds 260 employees with skills suitable for the new Internet Division. HR then provides management with the list of names, titles, skills and salary ranges.

The management team tallies revenue numbers to see how much Internet-related business the company has conducted in the past and present. It immediately becomes the #1 leader in Internet services. 75% of current employees with Internet services skills agree to move into the new Internet Division. Moreover, the simulation system also finds 100 external candidates at nearby customer and partner sites. Thus, they fill new Internet Division quickly.

Scenario 3

Sales rep. Jane is given a list of prospects in her territory to target. She is instructed to use the company's Salesforce Automation System. She spends several days researching a prior sales rep's input in the system, but finds prospect data to be inadequate. She describes it as "garbage in, garbage out." Over the next few months, she purchases numerous company profiles, executive biographies, and social media databases. Jane makes no sales and is fired 6 months later.

New sales rep. Fred hits the ground running. He accesses the simulation system of the disclosed principles to identify prospects based on relationships with his other prospects. He also runs a matrix of prospects with 2 corporate customers in the same field. He then runs a simulation of his prospects with his top 2 competitors.

He uses the system to qualify prospects based on the number of relationships each of them have. Those with little to no relationships, or multiple relationships with competitors, are placed at bottom of his prospect list. He discovers the simulation system generates strategic competitive intelligence that will allow him to bypass RFPs and competitors in the future. He can now get to multiple decision-makers and influencers at each prospect site by leveraging internal and external relationships the simulation system identifies. No more responses to RFPs, and no more cold calling for Fred.

Scenario 4

An account manager is working a customer account. He needs to grow the account horizontally by penetrating multiple divisions in the U.S. The account manager had previously relied on a single-point-of-contact in one division at a customer site to refer him to other divisions. The account manager runs a simulation system according to the disclosed principles and finds multiple relationships of employers, customers, partners, vendors, business consultants, investors, mergers, current and former employees with connections to his customer. The account manager can now team with all of these newly discovered contacts to grow the account.

Scenario 5

A strategy manager is supporting a division president to win new business with an airline. Several competitors are also responding to the same RFP. The strategy manager runs a simulation in accordance with the disclosed principles consisting of his company, the airline company, and two competitors. The strategy manager learns competitors have multiple internal and external relationships with the airline to draw upon. The simulation shows his company lacks internal or external relationships to leverage on this opportunity. The company's Board of Directors and executives are all home-grown executives having joined the company upon college graduation or leaving the military. Company executives are also conservative Republicans. The airline consists of union employees of the opposite political persuasion. The airline prospect may not view the company in a good light.

The strategy manager shares these findings with the division president. He decides to recruit a wealthy businessman and entrepreneur of the opposite political party to open some doors for the company. The strategy manager enters the businessman's name and company name into the system. The businessman schedules several meetings and lunches with airline influencers and decision-makers along with the division president. They use this time to convince the airline executives of the company's superior solutions. The company delivers the response to the RFP to the airline procurement department as instructed. And based on the newly created positive relationships initiated by the simulation, the company wins the contract.

Moreover, the strategy manager and division president share the simulation results with their CEO regarding the need for the company to recruit external executives for the Board of Directors and Advisory Council roles. The CEO agrees the company is in dire need of change, and thus begins to recruit customers, prospects, professors and politicians for the Board and Advisory Council positions.

Scenario 6

A marketing manager is assisting a division president working on a large IT outsourcing opportunity with a national retail chain. He is asked if the company has any internal or external relationships to leverage to win this new business. The marketing manager runs a simulation in accordance with the disclosed principles to seek shared datasets between the company and the national retail chain. The simulation reveals a shared dataset between the company's SVP sales and one of the national retail chain's Board of Directors. Both executives also have the same unusual last name. The marketing manager calls the SVP Sales office to see if he knows the retail chain's member of the Board of Directors. The office confirms the two men are brothers. The division president recruits SVP Sales to help him win the IT outsourcing contract with the national retail chain based on this discovered relationship.

In addition to the exemplary scenarios discussed above, additional exemplary uses for a system method constructed and implemented in accordance with the disclosed principles may further include:

University director of development seeks to place local business leaders across industries on president's council and multiple dept boards (sociology, math, education, science, business).

Political candidate seeks donations from big donors. Needs to find wealthy executives and individuals across industries in the U.S.

Real estate agent seeks to conduct mailing to high-level executives, employees and individuals across industries in local town.

Attorney utilizes the disclosed principles as a lead and referral generator.

Executive recruiter seeking experienced CEOs whose earnings are >$160,000,000/yr.

Private Investment company researching for merger and acquisition targets. Does due diligence as best as possible, but little to no information on private companies and start-ups.

Exemplary features for a system method constructed and implemented in accordance with the disclosed principles may include:

A computer-implemented system and method for identifying, calculating, formatting extracting, aggregating, linking and visualizing multi-dimensional data and/or metadata in a simulation environment for visual presentation to a user.

An exemplary method includes storing multi-dimensional metadata within a relational database system, receiving a request from a user interfacing with the system via a network interface, extracting search criteria and presentation preferences from the request, formulating and executing one or more queries on the database to retrieve the matching data, formatting the data in accordance with the request and/or in accordance with rules of the system, and returning the aggregated data to the requesting user in the form of visual simulated opportunities, strategies, plans and insight on interactive dashboards.

In exemplary embodiments, known and unknown shared datasets between businesses and individuals, such as employers, customers, competitors, prospects, partners, vendors, business consultants, investors, mergers, executives, employees and individuals, are identified by various attributes in a multi-dimensional metadata relational database and automatically displayed visually in an aggregated manner to each end-user on-demand in the form of simulated opportunities, strategies, plans and insight on interactive web-based dashboards using the established framework.

The disclosed principles provide varying levels of insight for each end-user, and simulation results are customizable for each end-user based on selection criteria provided by the end-user.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A computer implemented system, comprised of both hardware and software, for retrieving application metadata in an interactive environment from metadata tables regarding business organizations and individuals who are subscribers of the system as well as non-subscribers of the system, and generating a multi-dimensional visual representation of a plurality of structured metadata objects, the system comprising:
   a data storage, in communication with one or more computer processors, for storing empirical data in structured metadata profiles corresponding to one or more subscribing and non-subscribing business organizations, and one or more subscribing and non-subscribing individuals currently or previously associated with one or more of said subscribing and non-subscribing organizations, the empirical data comprising information specific to said subscribing and non-subscribing organizations, and said subscribing and non-subscribing individuals gathered from a plurality of data sources internal and external to said system;
   a user interface, implemented via one or more computer processors, configured to receive a query from a user of the system, the query comprising one of said subscribing and non-subscribing organizations and sent to a system processor for processing, wherein the system processor retrieves empirical data from the data storage;
   a data aggregator, implemented via one or more computer processors, configured to:
      identify one or more of said subscribing and non-subscribing individuals currently having a business relationship with the one of said subscribing and non-subscribing organizations;
      identify others of said subscribing and non-subscribing organizations having both a business relationship with said one of said subscribing and non-subscribing organizations and a current or previous business relationship with said identified one or more of said subscribing and non-subscribing individuals;
      identify one or more pieces of said information common to one or more of said identified subscribing and non-subscribing individuals and others of said subscribing and non-subscribing individuals having a current or previous business relationship with said one of said subscribing and non-subscribing organizations or said identified others of said subscribing and non-subscribing organizations; and
      retrieve profiles from the data storage corresponding to said identified one or more of said subscribing and non-subscribing individuals, identified others of said subscribing and non-subscribing individuals, and said identified others of said subscribing and non-subscribing organizations;
   a visualization component, implemented via one or more computer processors, configured to provide and illustrate a distinct visual indicator corresponding to each of said identified one or more subscribing and non-subscribing individuals and said identified others of said subscribing and non-subscribing individuals, and corresponding to each of said pieces of information common among said one or more of said identified subscribing and non-subscribing individuals and said others of said subscribing and non-subscribing individuals;
   a display generator, implemented via one or more computer processors, configured to create one or more visible representations for display to the user via the user interface, each comprising a presentation of said one of said subscribing or non-subscribing organization, said others of said subscribing and non-subscribing organizations, said one or more identified subscribing and non-subscribing individuals, and said others of said subscribing and non-subscribing individuals having pieces of information common with one or more of said subscribing and non-subscribing identified individuals, and to display structured metadata objects, profiles and connections between one or more of the distinct visual indicators; and
   wherein said one or more created visible representations for display and said distinct visual indicators can be saved in the system by the user.

2. The system of claim 1, wherein the data aggregator is further configured to categorize said others of said subscribing and non-subscribing organizations or said others of said subscribing and non-subscribing individuals based on the common pieces of information.

3. The system of claim 1, wherein the visual indicators are selected from the group consisting of font colors, font styles, colored boxes, shaded boxes, and hatched boxes.

4. The system of claim 1, wherein the system is further configured to display the one or more visible representations to the user via an interactive graphical user interface, and wherein the interactive graphical user interface is configured to receive the query from the user.

5. The system of claim 1, wherein the displayed connections are presented as one or more lines connecting between one or more corresponding visual indicators.

6. The system of claim 4, wherein the interactive graphical user interface is configured to receive a selection by the user of one or more pieces of said information within retrieved profiles for determining a group of said subscribing and non-subscribing individuals or said subscribing and non-subscribing organizations matching said selected one or more pieces of information.

7. The system of claim 6, wherein the display generator is further configured to create one or more visible representations for display to the user, each comprising a presentation of retrieved structured metadata objects and profiles, and visual indicators illustrating matching selected one or more pieces of information common among one or more of said subscribing and non-subscribing individuals or said subscribing and non-subscribing organizations.

8. The system of claim 1, wherein the data storage is configured to store the empirical data in the profiles via structured metadata, and wherein the one or more pieces of information comprise select metadata objects from said structured metadata.

9. The system of claim 1, wherein the user interface is further configured to receive a further query from the user of the system, the further query comprising one of the identified others of said subscribing and non-subscribing organizations, and wherein thereafter the data aggregator is further configured to:
- identify further one or more subscribing and non-subscribing individuals having a business relationship with said one of said identified others of said subscribing and non-subscribing organizations comprising the further query,
- identify further others of subscribing and non-subscribing organizations having both a business relationship with said one of said identified others of said subscribing and non-subscribing organizations and a current or previous business relationship with said identified further one or more subscribing and non-subscribing individuals,
- identify further one or more pieces of said information common to one or more of said identified further subscribing and non-subscribing individuals and further others of subscribing and non-subscribing individuals having a current or previous business relationship with any of said subscribing and non-subscribing organizations, and
- retrieve profiles from the data storage corresponding to said identified further one or more subscribing and non-subscribing individuals, said identified further others of subscribing and non-subscribing individuals, and said identified further others of subscribing and non-subscribing organizations;
- wherein the visualization component is further configured to provide and illustrate one or more further distinct visual indicators corresponding to each of said identified further one or more subscribing and non-subscribing individuals and identified further others of subscribing and non-subscribing individuals, and corresponding to each of said pieces of information common among said identified further one or more subscribing and non-subscribing individuals and said identified further others of subscribing and non-subscribing individuals;
- wherein the display generator is further configured to create one or more visible representations for display to the user via the user interface, each comprising a presentation of said one of said identified others of said subscribing and non-subscribing organizations comprising the further query, said identified further others of subscribing and non-subscribing organizations, said identified further one or more identified subscribing and non-subscribing individuals, and said identified further others of subscribing and non-subscribing individuals having pieces of information common with one or more identified further subscribing and non-subscribing individuals, and to display structured metadata objects, profiles and connections between one or more of the further distinct visual indicators; and
- wherein the one or more created visible representations for display and said distinct visual indicators can be saved.

10. The system of claim 1, wherein the one or more visible representations comprises one or more tables, and wherein each of the one or more tables comprises additional pieces of information of a corresponding subscribing and non-subscribing individual or subscribing and non-subscribing organization having one or more of the identified common pieces of information.

11. The system of claim 10, wherein a display of a plurality of the one or more tables comprises a visual hierarchy of said subscribing and non-subscribing individuals or subscribing and non-subscribing organizations having one or more of the identified common pieces of information.

12. The system of claim 11, wherein the visual hierarchy is based on a selection of one or more of the identified common pieces of information.

13. The system of claim 1, wherein the distinct visual indicator illustrates information common between said identified one or more subscribing and non-subscribing individuals currently having a business relationship with said one of said subscribing and non-subscribing organizations;
- wherein the distinct visual indicator illustrates information common between said identified others of said subscribing and non-subscribing organizations having both a business relationship with said one of the subscribing and non-subscribing organizations and a current or previous business relationship with said identified one or more subscribing and non-subscribing individuals; and
- wherein the distinct visual indicator illustrates information common between said identified one or more of said identified subscribing and non-subscribing individuals and others of said subscribing and non-subscribing individuals having a current or previous business relationship with said one of the subscribing and non-subscribing organizations or identified others of said subscribing and non-subscribing organizations.

14. The system of claim 13, wherein the one or more pieces of information are selected from the group consisting of individual name, financial income, contact information, gender, age, level of education, educational institute attended, graduation date, professional experience, professions, professional positions, employment or professional title, employment division, personal interests, skills, affiliations, association memberships, and professional relationship with respect to another individual or organization.

15. The system of claim 14, wherein the one or more pieces of information of professional relationship of an subscribing and non-subscribing individual or subscribing and non-subscribing organization with respect to another subscribing and non-subscribing individual or subscribing and non-subscribing organization is selected from the group consisting of employer, employee, owner, executive, partner, investor, consultant, customer, client, competitor, banker, legal counsel, accountant, and vendor.

16. The system of claim 1, wherein the graphical user interface is configured to be presented to the user via a web browser application.

17. The system of claim 1, wherein the data sources are selected from the group consisting of websites, search engines, web crawlers, wire services, non-subscribers and subscribers of the system.

18. A method for retrieving application metadata and generating a multi-dimensional visual representation of a plurality of structured metadata objects regarding business organizations and individuals who are subscribers of a system implementing the method as well as non-subscribers of the system, the method comprising:

- storing empirical data in structured metadata profiles corresponding to one or more subscribing and non-subscribing business organizations, and one or more subscribing and non-subscribing individuals currently or previously associated with one or more of said subscribing and non-subscribing organizations, the empirical data comprising information specific to said subscribing and non-subscribing organizations, and said subscribing and non-subscribing individuals gathered from a plurality of data sources internal and external to said system;
- receiving a query from a user of the system via a user interface, the query comprising one of said subscribing and non-subscribing organizations;
- aggregating data from the data storage based on the query to:
  - identify one or more of said subscribing and non-subscribing individuals currently having a business relationship with the one of said subscribing and non-subscribing organizations;
  - identify others of said subscribing and non-subscribing organizations having both a business relationship with said one of said subscribing and non-subscribing organizations and a current or previous business relationship with said identified one or more subscribing and non-subscribing individuals;
  - identify one or more pieces of said information common to one or more of said identified subscribing and non-subscribing individuals and others of said subscribing and non-subscribing individuals having a current or previous business relationship with said one of said subscribing and non-subscribing organizations or identified others of said subscribing and non-subscribing organizations; and
  - retrieve profiles from the data storage corresponding to the identified one or more of said subscribing and non-subscribing individuals, said identified subscribing and non-subscribing individuals and others of said subscribing and non-subscribing individuals, and said identified others of said subscribing and non-subscribing organizations;
- providing a visualization of the aggregated data, including illustrating and providing a distinct visual indicator corresponding to each of said identified one or more subscribing and non-subscribing individuals and identified others of said subscribing and non-subscribing individuals, and corresponding to each of the pieces of information common among said one or more of said identified subscribing and non-subscribing individuals and said others of said subscribing and non-subscribing individuals;
- generating a display comprising one or more visible representations for display to the user via the user interface, each comprising a presentation of said one of said subscribing or non-subscribing organization, said others of said subscribing and non-subscribing organizations, said one or more identified subscribing and non-subscribing individuals, and said others of said subscribing and non-subscribing individuals having pieces of information common with one or more of said identified subscribing and non-subscribing individuals, and to display structured metadata objects, profiles and connections between one or more of the distinct visual indicators, and
- saving said visible representations and the distinct visual indicators in the system.

19. The method of claim 18, wherein aggregating data further comprises categorizing said others of said subscribing and non-subscribing organizations or said others of said subscribing and non-subscribing individuals based on the common pieces of information.

20. The method of claim 18, wherein the visual indicators are selected from the group consisting of font colors, font styles, colored boxes, shaded boxes, and hatched boxes.

21. The method of claim 18, wherein generating a display further comprises displaying the one or more visible representations to the user via an interactive graphical user interface, and wherein the interactive graphical user interface is configured to receive the query from the user.

22. The method of claim 18, wherein the displayed connections are presented as one or more lines connecting between one or more corresponding visual indicators.

23. The method of claim 21, wherein the interactive graphical user interface is configured to receive a selection by the user of one or more pieces of said information within retrieved profiles for determining a group of said subscribing and non-subscribing individuals or said subscribing and non-subscribing organizations matching said selected one or more pieces of information.

24. The method of claim 23, wherein generating a display further comprises creating one or more visible representations for display to the user, each comprising a presentation of retrieved structured metadata objects and profiles, and visual indicators illustrating matching selected one or more pieces of information common among one or more of said subscribing and non-subscribing individuals or said subscribing and non-subscribing organizations.

25. The method of claim 18, wherein storing comprise storing the empirical data in the profiles via structured metadata, and wherein the one or more pieces of information comprise select metadata objects from said structured metadata.

26. The method of claim 18, the method further comprising:

- receiving a further query from the user of the system, the further query comprising one of said identified others of said subscribing and non-subscribing organizations, and thereafter further aggregating data based on the further query to:
  - identify further one or more subscribing and non-subscribing individuals having a business relationship with said one of said identified others of said subscribing and non-subscribing organizations comprising the further query,
  - identify further others of subscribing and non-subscribing organizations having both a business relationship with said one of the identified others of said subscribing and non-subscribing organizations and a current or previous business relationship with said identified further one or more subscribing and non-subscribing individuals,
  - identify further one or more pieces of said information common to one or more of said identified further subscribing and non-subscribing individuals and further others of subscribing and non-subscribing individuals having a current or previous business relationship with any of said subscribing and non-subscribing organizations, and retrieve profiles from the data storage corresponding to said identified further one or more subscribing and non-subscribing individuals, said identified further others of subscribing and non-subscribing individuals, and said identified further others of subscribing and non-subscribing organizations;

providing a visualization of the further aggregated data, including illustrating and providing one or more further distinct visual indicators corresponding to each of the identified further one or more subscribing and non-subscribing individuals and identified further others of subscribing and non-subscribing individuals, and corresponding to each of the pieces of information common among said identified further one or more of subscribing and non-subscribing individuals and said identified further others of subscribing and non-subscribing individuals; and generating a further display comprising one or more visible representations for display to the user via the user interface, each comprising a presentation of said one of said identified others of said subscribing and non-subscribing organizations comprising the further query, said identified further others of subscribing and non-subscribing organizations, said identified further one or more identified subscribing and non-subscribing individuals, and said identified further others of subscribing and non-subscribing individuals having pieces of information common with one or more identified further subscribing and non-subscribing individuals, and to display structured metadata objects, profiles and connections between one or more of the further distinct visual indicators.

27. The method of claim 26, wherein each of the one or more visible representations comprises one or more tables, and wherein each of the one or more tables comprises additional pieces of information of a corresponding subscribing and non-subscribing individual or subscribing and non-subscribing organization having one or more of the identified common pieces of information.

28. The method of claim 27, wherein a display of a plurality of the one or more tables comprises a visual hierarchy of said subscribing and non-subscribing individuals or subscribing and non-subscribing organizations having one or more of the identified common pieces of information.

29. The method of claim 28, wherein the visual hierarchy is based on a selection of one or more of the identified common pieces of information.

30. The method of claim 18, wherein the distinct visual indicator illustrates information common between said identified one or more subscribing and non-subscribing individuals currently having a business relationship with said one of said subscribing and non-subscribing organizations;

wherein the distinct visual indicator illustrates information common between said identified others of said subscribing and non-subscribing organizations having both a business relationship with said one of the subscribing and non-subscribing organizations and a current or previous business relationship with said identified one or more subscribing and non-subscribing individuals; and wherein the distinct visual indicator illustrates information common between said identified one or more of said identified subscribing and non-subscribing individuals and others of said subscribing and non-subscribing individuals having a current or previous business relationship with said one of the subscribing and non-subscribing organizations or identified others of said subscribing and non-subscribing organizations.

31. The method of claim 30, wherein the one or more pieces of information are selected from the group consisting of individual name, financial income, contact information, gender, age, level of education, educational institute attended, graduation date, professional experience, professions, professional positions, employment or professional title, employment divisions, personal interests, skills, affiliations, association memberships, professional relationship with respect to another subscribing and non-subscribing individual or subscribing and non-subscribing organization.

32. The method of claim 31, wherein the one or more pieces of information of professional relationship of a subscribing and non-subscribing individual or subscribing and non-subscribing organization with respect to another subscribing and non-subscribing individual or subscribing and non-subscribing organization is selected from the group consisting of employer, employee, owner, executive, partner, investor, consultant, customer, client, competitor, banker, legal counsel, accountant, and vendor.

33. The method of claim 18, further comprising presenting the graphical user interface to the user via a web browser application.

34. The method of claim 18, wherein the data sources are selected from the group consisting of websites, search engines, web crawlers, wire services, non-subscribers and subscribers of the system.

* * * * *